United States Patent [19]

Ojima et al.

[11] Patent Number: 4,538,509
[45] Date of Patent: Sep. 3, 1985

[54] AUTOMATIC BREAD BAKING MACHINE

[75] Inventors: Shin Ojima, Yao; Hideaki Kamiuchi, Matsubara; Keiji Mine, Yao, all of Japan

[73] Assignee: Hosiden Electronics Co., Ltd., Osaka, Japan

[21] Appl. No.: 625,872

[22] Filed: Jun. 28, 1984

[30] Foreign Application Priority Data

Aug. 22, 1983 [JP] Japan ............................. 58-130100
Dec. 2, 1983 [JP] Japan ............................. 58-185758

[51] Int. Cl.³ ............................................. A47J 27/00
[52] U.S. Cl. ...................................... 99/348; 99/352; 366/98; 366/144
[58] Field of Search ................. 99/348, 352, 353, 483, 99/484, 486; 366/144, 146, 69, 98

[56] References Cited

U.S. PATENT DOCUMENTS

| | | | |
|---|---|---|---|
| 4,202,258 | 5/1980 | Masuda | 99/348 |
| 4,294,166 | 10/1981 | Takeuchi | 99/348 |
| 4,436,432 | 3/1984 | Drocco | 99/348 |
| 4,450,758 | 5/1984 | Belinkoff | 99/348 |

Primary Examiner—Robert W. Jenkins
Attorney, Agent, or Firm—Pollock, Vande Sande and Priddy

[57] ABSTRACT

An automatic bread baking machine wherein, at a predetermined time prior to a preset time, water is supplied into a container, in which the ingredients of bread are mixed into the water by rotating a rotary vane provided in the container, producing dough. A fixed rod is provided in the container adjacent to and spaced from the rotary vane, and the dough is twined around the fixed rod by the rotary vane and kneaded at comparatively low speed by the cooperation of the rotary vane and the fixed rod. The dough temperature is sensed by a temperature sensor disposed in the fixed rod, and when the sensed temperature has reached a predetermined value, the dough kneading operation is terminated. The water is supplied into the container from a water tank covered with a heat-insulating layer. An ice box for containing ice is provided in the water tank, and when the ambient temperature is higher than a predetermined value, cold water is supplied to the container.

26 Claims, 20 Drawing Figures

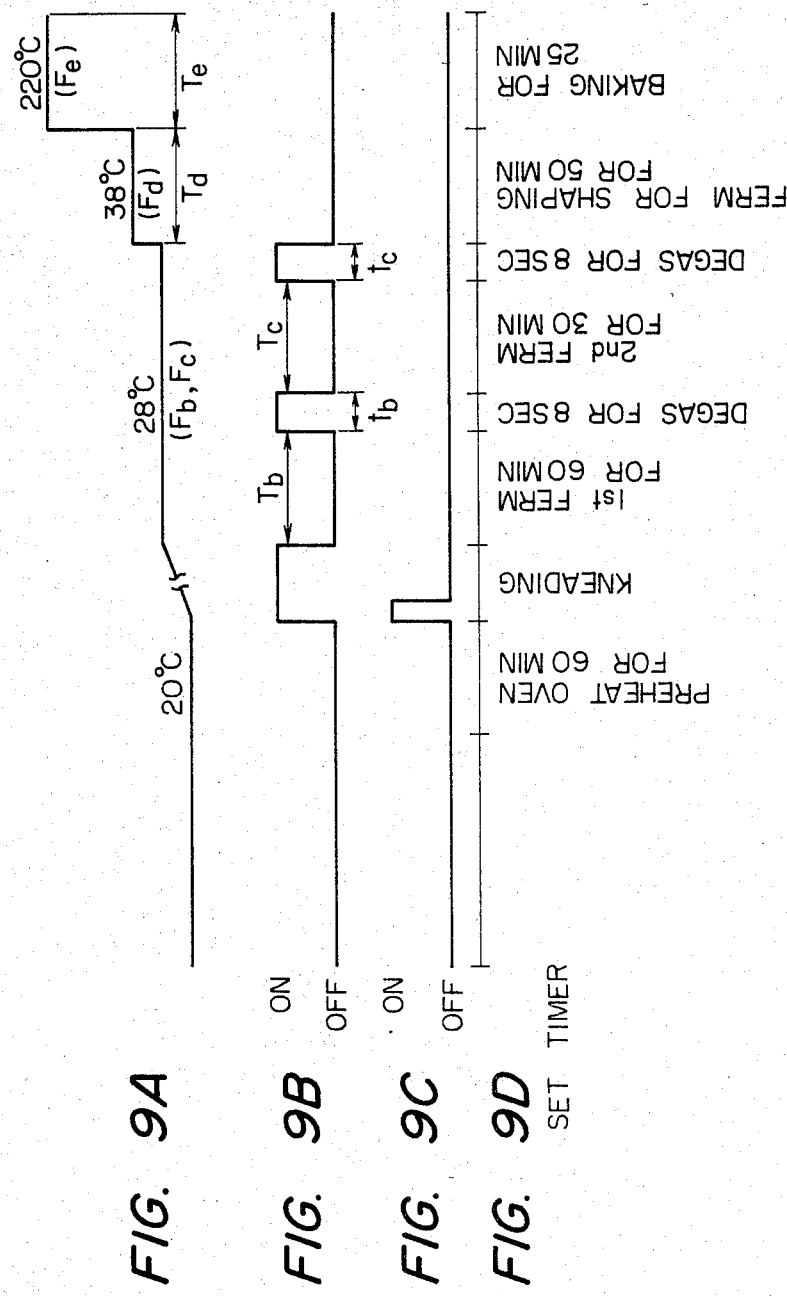

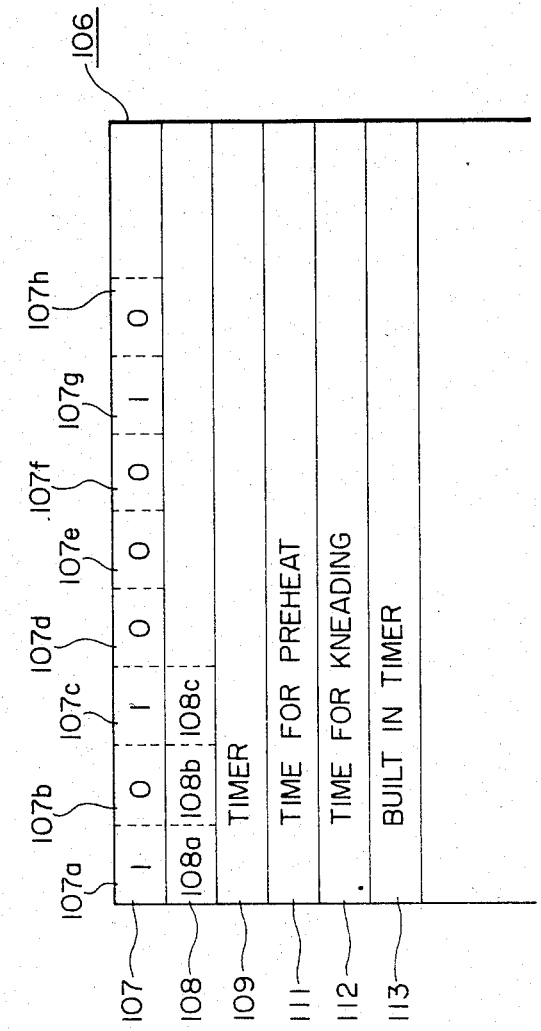

FIG. 11.

| MODE | ENTIRE TIME $T_0$ | WATER FEEDING TIME $T_a$ | TEMP $F_a$ AT THE END OF KNEAD | 1st FERM TEMP $F_b$ | 1st FERM TIME $T_b$ | DEGASSING TIME $t_b$ | 2nd FERM TEMP $F_c$ | 2nd FERM TIME $T_c$ | DEGASSING TIME $t_c$ | FERM FOR SHAPING TEMP $F_d$ | FERM FOR SHAPING TIME $T_d$ | BAKING TEMP $F_e$ | BAKING TIME $T_e$ | BAKING TIME $T_f$ |
|---|---|---|---|---|---|---|---|---|---|---|---|---|---|---|
| 1 | 3H 10M | 3M | 28°C | 28°C | 60M | 8S | 28°C | 30M | 8S | 38°C | 50M | 220°C | 20M | 5M |
| 2 | | | | | | | | | | | | | | |
| 3 | | | | | | | | | | | | | | |
| ----- | | | | | | | | | | | | | | |

AUTOMATIC BREAD BAKING MACHINE

BACKGROUND OF THE INVENTION

The present invention relates to an automatic bread baking machine for automatically baking a small amount of bread, mainly for home use.

A bread baking procedure starts with the preparation of dough by kneading the ingredients of bread, i.e. wheat flour, a yeast fungus and small amounts of butter and sugar, with water. The dough is primary-fermented, degassed, secondary-fermented, degassed and fermented for shaping, and thereafter baked. Usually, about three to four hours are needed for baking bread after starting the kneading of the ingredients. Accordingly, for example, if it is desired to complete baking at seven o'clock in the morning, then it is necessary to start kneading of the ingredients of bread at about 3 a.m. A conventional domestic kneader for kneading the ingredients of bread includes a rotary vane which is driven at the comparatively high speed of 400–800 rpm, and for example, in a container containing the ingredients, the kneading operation produces violent vibrations and loud noises. Accordingly, it is not desirable to operate such a noisy kneader early in the morning. While there have been proposed kneaders for business use that have a low speed rotary vane (e.g. 50–100 rpm), if such a low rotational speed is employed in domestic kneaders whose containers have a relatively small size, the tangential velocity of the vane would be small, resulting in less production of gluten. Thus, it has been conventional to employ a high rotational speed for domestic kneaders. There has been proposed a kneader having projections on the interior surface of the container for the purpose of increasing the kneading efficiency. With this type of kneader, however, since the dough is rotated by the rotary vane and hit against the projections to heighten the kneading effect, violent vibrations and loud noises are generated.

Furthermore, the conditions for kneading, fermentation and degassing of the dough vary under the influence of temperature or humidity; therefore, the conditions for making bread differ with season. With conventional bread baking machines, the kneading time, the temperature in the container and other conditions are adjusted by the baker in accordance with season, temperature and humidity prior to the kneading and the fermentation step. This adjustment cannot always be done satisfactorily and it is difficult to bake uniformly excellent bread at all times. In particular, as the ingredients of bread are kneaded, the dough temperature rises, and if the dough temperature is raised too high, excellent bread cannot be obtained.

In conventional bread baking machines for domestic use, a kneader, a fermenter and a baking oven are usually separate of one another, but in some of the conventional machines they are assembled together. In the latter type 8 machine, however, the dough produced by the kneader is manually transferred to the fermenter and the fermented dough is manually transferred to the oven. Further, control of the fermenter and the oven is also manual. That is, there has not been put to practical use an automatic bread baking machine which does not involve any manual operations until bread is baked after its ingredients are put in the machine.

What is disclosed in, for example, Japanese Utility Model Public Disclosure No. 10388/81, is a machine which starts the kneading operation immediately after the ingredients of bread are put in a container. Further, Japanese Utility Model Public Disclosures Nos. 45284/81, 68480/81 and 89384/81 disclose bread baking machines of the type in which the ingredients of bread are preset and the kneading operation is started at a predetermined time. But, these machines are complex in structure and have not been put to practical use.

It is an object of the present invention to provide an automatic bread baking machine which permits automatic baking of bread without involving any manual operations after the ingredients of bread are put in the machine.

Another object of the present invention is to provide an automatic bread baking machine which permits sufficient kneading of the ingredients of bread at a low rotating speed, and hence does not produce violent vibrations and loud noises.

Yet another object of the present invention is to provide an automatic bread baking machine which permits baking of excellent bread at all times without being affected by ambient temperature.

SUMMARY OF THE INVENTION

According to the present invention, a container for the ingredients of bread and a water tank are demountably mounted in a housing. In the container, the ingredients and water can be kneaded by rotating a rotary vane to obtain dough, and the dough can be fermented and baked by a heater. The ingredients of bread are put in the container in advance, and by a controller, water in the water tank is supplied into the container and the rotary vane is rotated to mix the ingredients with the water to obtain dough. Under the control of the controller, the dough is fermented in the container and the rotary vane is driven for a short period of time to degas the fermented dough, after which the dough is fermented again and the shaped dough is baked by the heater in the container.

In the container, a fixed rod is provided to extend in the radial direction of the circle of rotation of the rotary vane in adjacent and parallel relation thereto. When kneaded, the dough is twined around the fixed rod and pushed around it by the rotary vane; namely, the dough is sufficiently kneaded by the cooperation of the fixed rod and the rotary vane. In this case, even if the rotary vane is driven at, for example, only 150–300 rpm or so, excellent kneading can be achieved. Upon detecting that, as a result of the kneading, the dough temperature has risen to a predetermined value, for example, 28° C., the kneading step is immediately finished. For detecting the dough temperature, a temperature sensor is disposed in the fixed rod and the detected output from the temperature sensor is used. Further, a heat-insulating layer is provided around the water tank. Cold water is put in the water tank, or ice is put in an ice case provided in the water tank, from which the water is supplied to the container during kneading of the dough. By this, even when the ambient temperature is high, for instance, in the summer, the dough can be sufficiently kneaded until its temperature reaches a predetermined value for tasty bread. In addition, the fermentation of the dough can also be effected satisfactorily at a predetermined temperature.

A mount is fixed to the bottom panel of the container, for fixedly mounting it in the housing of the baking machine. A heat-insulating layer is interposed between the mount and the bottom panel of the container to suppress the escape of heat from the bottom panel of the container during baking, permitting sufficient baking of the dough in the vicinity of the bottom panel of the container. Furthermore, in the present invention, since the top opening of the container is closed by a top panel, the space inside the container is substantially filled with water vapor, which prevents the surface of the dough from getting dry. The top panel has a recess, at the center of which is formed a small hole for releasing the pressure increased by fermentation. By releasing, through the small hole, a suitably small amount of the water vapor along with the gas produced by the fermentation, it is possible to prevent formation of condensation which may drip on the dough. During kneading, the water from the water tank can be supplied through this small hole. It is also possible to supply city water to the housing by means of a hose instead of providing the water tank in the housing and to effect ON-OFF control of the water supply to the container as by an electromagnetic valve. Also it is possible to provide a fan in the housing so that an air current is passed into the container during kneading.

BRIEF DESCRIPTION OF THE DRAWINGS

FIGS. 9A B, C and D are timing charts showing, by way of example, control of temperature of a heater, control of a motor for the rotary vane and control of a motor for a pump in the operation of the bread baking machine of the present invention;

FIG. 10 is a diagram showing, by way of example, various areas of a RAM 106 in the microcomputer;

FIG. 11 is a diagram showing the relationships of the kinds and amounts of bread to the time and temperature in each step;

DESCRIPTION OF THE PREFERRED EMBODIMENTS

General Arrangement

Figure 1:
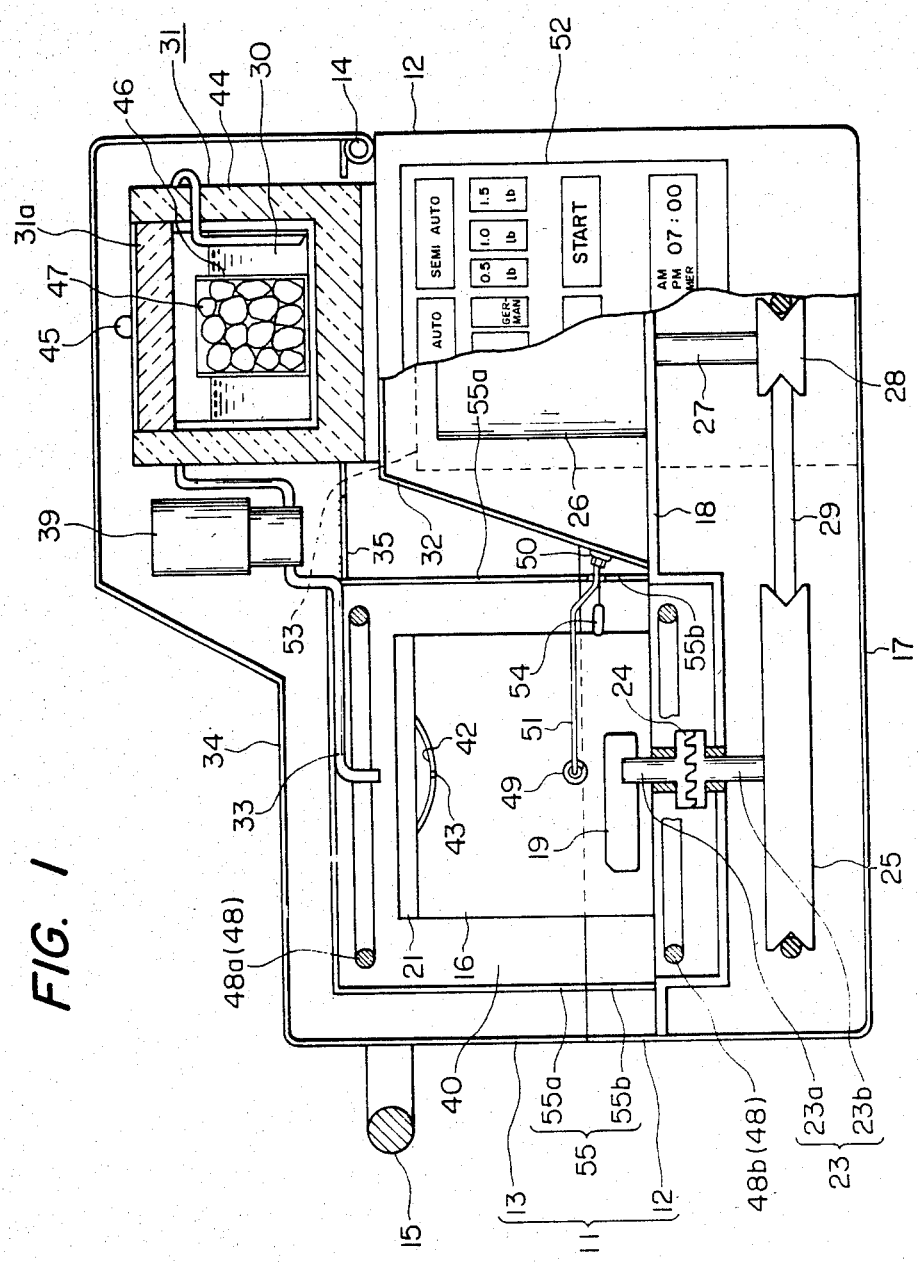
FIG. 1 is a sectional view illustrating an embodiment of the automatic bread baking machine of the present invention.
Figure 2:
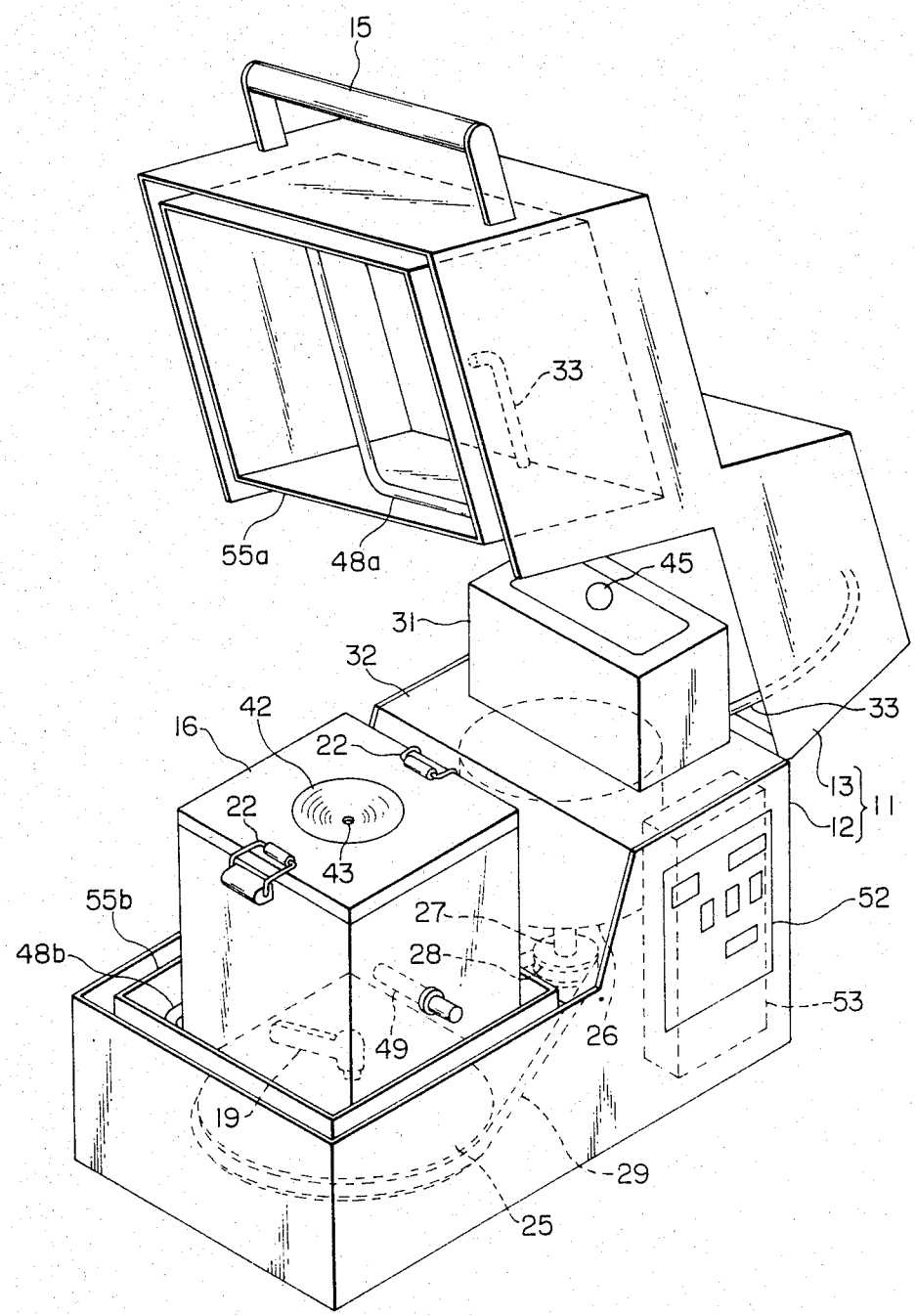
FIG. 2 is a perspective view illustrating the general arrangement of the automatic bread baking machine of FIG. 1, with a top housing member 13 open.

FIGS. 1 and 2 illustrate an embodiment of the automatic bread baking machine of the present invention. A housing 11 of the bread baking machine is substantially rectangular parallelepipedic in shape, and its right half portion in FIG. 1 is formed taller than the left half portion. The housing 11 is comprised of bottom and top housing members 12 and 13. The top housing member 13 is pivotally connected at the marginal edge of its taller right portion to the bottom housing member 12 by means of a hinge 14, and hence can be turned about it to cover or uncover the bottom housing member 12. A handle 15 for handling the top housing member 13 is mounted on its side panel opposite from the hinge 14. A container 16 is removably mounted in the housing 11. The housing 11 has fixedly secured thereto a base plate 18 substantially in parallel to its bottom panel 17 in the vicinity thereof, and the container 16 is detachably mounted on the base plate 18 in the bottom housing member 12 on the left-hand side in FIG. 1. A description will be given later of means for mounting the container 16 on the base plate 18.

A rotary vane 19 is rotatably mounted on the bottom of the container 16 and is driven to knead the ingredients of bread and water in the container 16, obtaining dough. The container 16 is substantially rectangular parallelepipedic in shape and its top panel is used as a lid 21, which can be fixedly held on the container 16 by fixing means 22 attached to upper marginal portions of a pair of opposed side panels of the container 16. A rotary shaft 23 is passed through the bottom panel of the container 16 centrally thereof. The rotary shaft 23 is comprised of an upper shaft 23a which is rotatably supported by the bottom panel of the container 16 and a lower shaft 23b which is rotatably supported by the base plate 18. The upper and lower shafts 23a and 23b are coupled together by a clutch 24. The upper end of the upper shaft 23a carries the rotary vane 19. A pulley 25 is mounted on the lower end of the lower shaft 23b under the base plate 18. A motor 26 is mounted on the base plate 18 in the housing 11 on the side of the hinge 14. A rotary shaft 27 of the motor 26 projects out of the base plate 18 downwardly thereof and carries at its projecting end a pulley 28, which is connected by a belt 29 to the pulley 25. Thus the rotary vane 19 can be driven by the motor 26.

A water tank 31 is mounted in the housing 11 for supplying water 30 from the tank 31 into the container 16. In this example, a base plate 32 is fixed to the base plate 18 and the water tank 31 is mounted on the base plate 32. The water tank 31 is disposed higher than the container 16. One end portion of a pipe 33 is inserted into a small hole made in a side wall of the water tank 31 and the inserted end of the pipe 33 is disposed at the bottom of the water tank 31. The pipe 33 is led out of the water tank 31 on the side of the hinge 14 and directed around the water tank 31 to a position just above the container 16. The other end of the pipe 33 is held on the top housing member 13 so that it faces downward in opposing relation to the central portion of the lid 21 of the container when the top housing member 13 lies on the bottom housing member 12 to cover it.

A pump 39 is connected to the intermediate portion of the pipe 33. The pump 39 is mounted on the top housing member 13. By driving the pump 39, the water 30 in the water tank 31 is supplied via the pipe 33 to the container 16. The lid 21 of the container 16 has a centrally disposed shallow circular recess 42 which is arcuate in section, and a small hole is made in the lid 21 at the center of the circular recess 42. Accordingly, the water from the pipe 33 is supplied into the recess 42, from which it drops into the container 16 through the small hole 43. The water tank 31 is covered with a heat-insulating layer 44. A top panel of the water tank 31 is used as a lid 31a, which has a knob 45. An ice box 46 is disposed in the water tank 31 for containing therein ice 47 by which the temperature of the water 30 in the water tank 31 can be held low, as required.

A heater 48 is provided for heating the container 16. The heater 48 is comprised of a top heater 48a and a bottom heater 48b. The top heater 48a is a square ring-shaped heater which is held in the top housing member 13 so that it lies slightly above the lid 21 of the container 16 substantially in parallel thereto when the top housing member 13 is placed in position covering the bottom housing member 12. The bottom heater 48b is also a square ring-shaped heater disposed slightly below the bottom panel of the container substantially in parallel thereto. Each side of the heaters 48a and 48b is larger than each side of the top panel of the container 16.

In the container 16 a fixed rod is disposed to extend above the circle of rotation of the rotary vane 19 in the radial direction thereof. In this example, the fixed rod 49 is attached to one of the side panels of the container 16. The fixed rod 49 has incorporated therein a temperature sensor, though not shown, and its lead 51 is led out of the container 16. The lead 51 is detachably connected by a connector 50 to the mating connector disposed, for example, on the vertical portion of the base plate 32.

A control panel 52 is provided on the front of the housing 11 at one side thereof, and a controller 53 is disposed behind the control panel 52. In response to the condition entered from the control panel 52 the controller 53 activates the pump 39 to supply the water 30 from the water tank 31 into the container 16 and, at the same time, activates the motor 26 to drive the rotary vane 19, starting a kneading step. The ingredients of bread are repeatedly twisted around the fixed rod 49 by the rotation of the rotary vane 19; namely, the ingredients are kneaded into dough. When the temperature sensor in the fixed rod 49 indicates a predetermined value, the controller 53 terminates the kneading step, which is followed by a fermentation step. Degassing in the fermentation step is carried out by driving the rotary vane 19 for a short period of time.

Upon completion of fermentation for shaping in the fermentation step, the heater 48 is turned ON to start a baking step. By baking at a predetermined temperature over a predetermined period of time, bread is baked in the container 16. A temperature sensor 54 is disposed near the container 16 for the purpose of temperature control during baking.

The container 16 can be made double-walled, as required, by providing an inner panel 55 inside the housing 11. The inner panel 55 is also comprised of top and bottom inner panels 55a and 55b corresponding to the top and bottom housing members 13 and 12, respectively. The top and bottom inner panels 55a and 55b are formed to extend to the side of the base plate 32, too. In the housing 11 the inner panel 55 and the base plate 18 surround and isolate the container 16 and the heater 48, defining a heating chamber 40. The temperature sensor 54 is used to detect the temperature in the heating chamber 40.

Specific Example of Structure for Mounting Container 16

Figure 3:
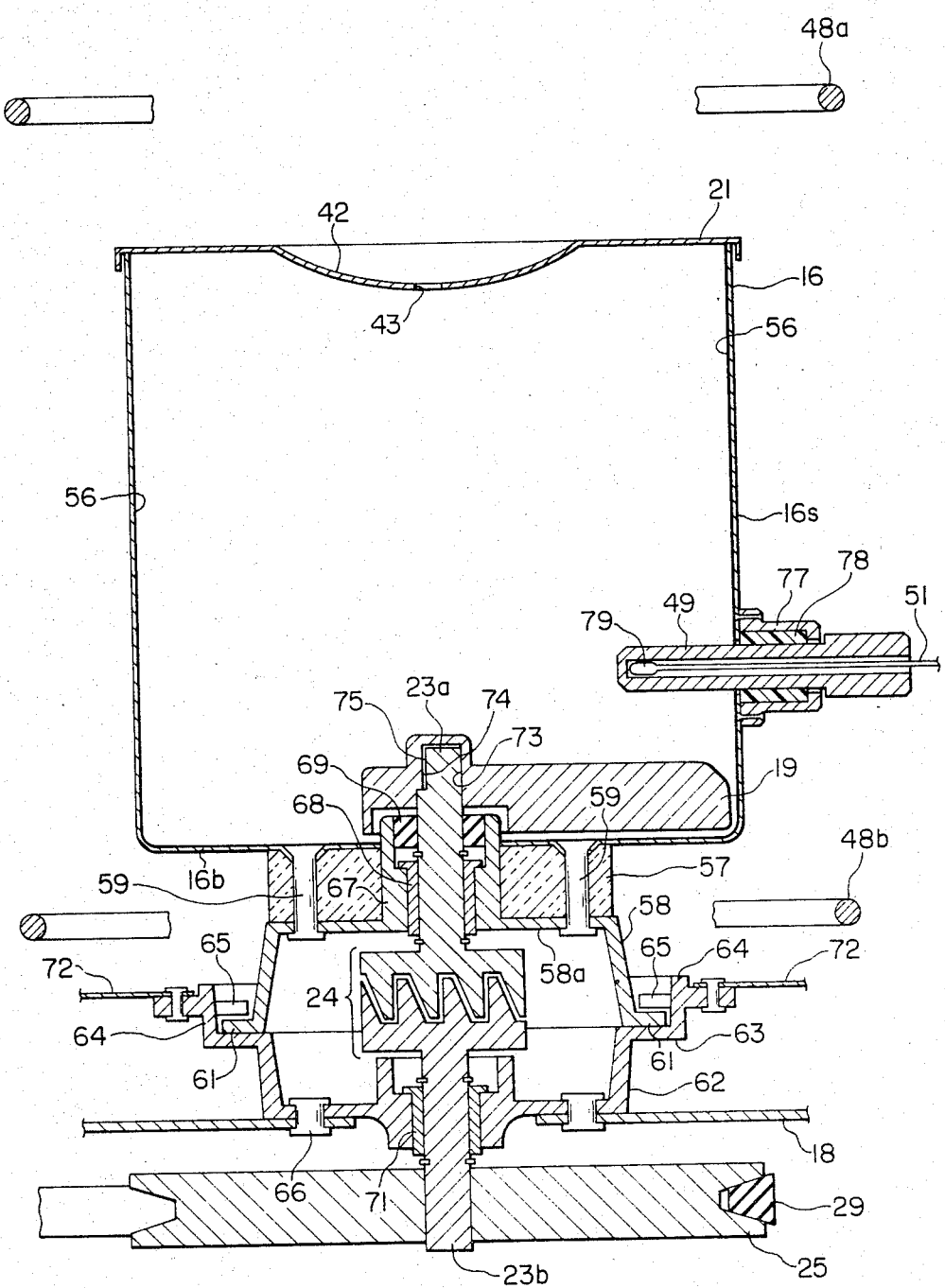
FIG. 3 is a sectional view illustrating an example of a structure for mounting a container 16.

Next, a description will be given, with reference to FIG. 3, of the mounting of the container 16 on the base plate 18, the rotary vane 19 and the fixed rod 49 and so forth. In FIG. 3 the parts corresponding to those in FIG. 1 are identified by the same reference numerals. The container 16 is made of, for instance, aluminum, and its inner surface is coated with a heatproof film 56 as of tetrafluoroethylene so that baked bread can easily be taken out of the container 16 without adhering to its interior surface. A mount 58 is fixedly secured to the underside of the bottom panel 16b of the container 16 through a heat-insulating layer 57. The heat-insulating layer 57 is made of a material of low thermal conductivity, which prevents the transmission of heat, such as tetrafluoroethylene or silicone rubber. The mount 58 is made by, for example, die-casting of metal into the form of a truncated cone. A top panel 58a of the mount 58, the bottom panel 16b of the container 16 and the heat-insulating layer 57 sandwiched therebetween are staked by means of rivets 59. The mount 58 has an edge flange 61 extending from the periphery of its lower end, and the flange 61 has formed therein a plurality of radial cuts at equiangular intervals, though not shown.

On the other hand, a shallow, bottomed cylindrical cradle 62 made as by die-casting of metal is mounted on the base plate 18. The cradle 62 has an annular flange 63 extending from the periphery of its upper end for receiving the flange 61 of the mount 58 and a ring-shaped limit plate 64 raised about the periphery of the flange 63 for limiting lateral movement of the flange 61 of the mount 58. At least two pins 65 project inwardly of the limit plate 64 to extend just above or in contact with the flange 61 rested on the annular flange 63, limiting vertical movement of the mount 58. Since the flange 61 has radial cuts as mentioned above, the mount 58 can be disassembled from the cradle 62 by turning the mount 58 to bring its radial cuts into opposing relation to the pins 65. The cradle 62 has its bottom panel staked by rivets 66 to the base plate 18.

The top panel of the mount 58 has a centrally disposed aperture, around which a cylindrical portion 67 is formed to extend upwardly of the top panel. The cylindrical portion 67 passes through holes made in the bottom panel 16b of the container 16 and the heat-insulating layer 57 and slightly extends into the container 16. An oilless bearing 68 is fixedly disposed in the cylindrical portion 67, and the upper shaft 23a of the rotary shaft 23 is inserted through and rotatably held by the oilless bearing 68. A seal 69 as of silicone rubber is closely packed between the upper shaft 23a and the cylindrical portion 67 to prevent water from leaking out from between them. The lower end of the upper shaft 23a has the one half portion of the clutch 24. An oilless bearing 71 is fitted into a central hole made in the bottom panel of the cradle 62, and the lower shaft 23b of the rotary shaft 23 is rotatably held by the bearing 71. The upper end of the lower shaft 23b has the other half portion of the clutch 24. A cover 72 may also be provided near the top surface of the cradle 62 to extend in parallel to the base plate 18, as required.

Figure 4:
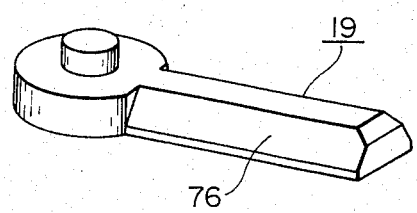
FIG. 4 is a perspective view showing a rotary vane 19.
Figure 5:
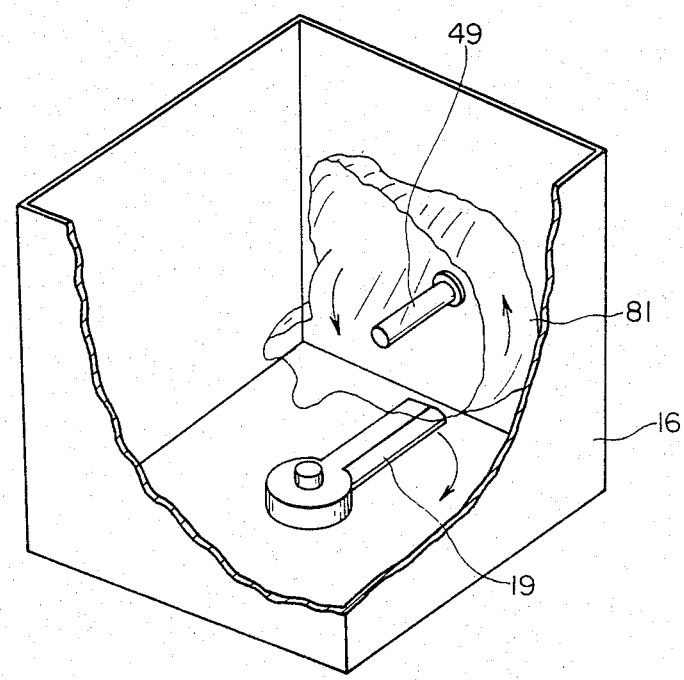
FIG. 5 is a schematic diagram showing how dough is kneaded by the rotary vane and a fixed rod.

The rotary vane 19 is detachably mounted on the rotary shaft 23 inserted into the container 16. The rotary vane 19 has a coupling hole 73 made in the bottom of its one end portion. The coupling hole 73 is substantially columnar but a portion of its inner peripheral surface is made flat, as indicated by 74. The peripheral surface of the end portion of the rotary shaft 23 is partly cut off to form a coupling face 75. The end portion of the rotary shaft 23 is inserted into the coupling hole 73, with the coupling face 75 of the former held in contact with the flat portion 74 of the latter, by which the rotary vane 19 is mounted on the rotary shaft 23. The rotary vane 19 rotates with the rotation of the rotary shaft 23. By lifting up the rotary vane 19, it can be disassembled from the rotary shaft 23. The rotary vane 19 extends substantially at right angles to the rotary shaft 23 and in adjacent but spaced relation to the bottom panel 16b of the container 16. The length of the rotary vane 19 from the rotary shaft 23 is a little smaller than a half the length of one side of the bottom panel 16b. As shown in FIG. 5, the portion of the rotary vane 19 which receives the rotary shaft 23 has a circular form, and as shown in FIGS. 3 and 4, a recess is formed in the bottom of the circular portion for receiving the cylindrical portion 67 inserted into the container 16. The face of the rotary vane 19 in the direction of its rotation is inclined, for example, about 60° to the bottom thereof, as indicated by 76. It is preferable that the rotary vane 19 be made of, for instance, aluminum, and coated with a film as of tetrafluoroethylene so as to facilitate releasing of bread from the rotary vane 19.

As shown in FIG. 3, a hole is made in the lower portion of one side panel 16s of the container 16 and a tubular holder 77 made of a metallic material is mounted on the outside of the side panel 16s in alignment with the hole. A hold ring 78 of a heatproof resinous material such as tetrafluoroethylene is fixedly mounted on the inner peripheral surface of the holder 77. The fixed rod 49 is inserted into the hold ring 78 from the outside of the side panel 16s and thus detachably mounted on the container 16. The fixed rod 49 is disposed above the circle of rotation of the rotary vane 19 relatively close thereto. The circle of rotation and the fixed rod 49 are spaced from one another by, for example, about 1.5 cm, in the case of baking a pound of bread. The fixed rod 49 extends in the radial direction of the abovesaid circle of rotation, and the length of the fixed rod 49 extending into the container 16 is approximately ¼ to 1/6 of one side of the bottom panel 16b of the container 16. The fixed rod 49 may preferably be made of, for instance, aluminum, and coated over the entire area of its outer peripheral surface with a releasing film as of tetrafluoroethylene so as to prevent bread from adhering thereto. The fixed rod 49 has formed therein a thin bore to extend from its outer end face to its inner end. A temperature sensor 79, for example, a negative temperature sensing resistance element, is disposed in the bore at the inner end thereof, and a lead 51 connected to the temperature sensor 79 is led out of the container 16. As the heaters 48a and 48b, nichrome wires are used, for instance.

Operation

After pouring the bread ingredients and water into the container 16, the pulley 29 is driven by the rotation of the motor 26 in FIG. 1, and the rotation of the lower shaft 23b is transmitted via the clutch 24 to the upper shaft 23a, driving the rotary vane 19. By the rotation of the rotary vane 19, the ingredients of bread are kneaded into dough, which is twined around the fixed rod 49. As shown in FIG. 5, the dough 81 twisted around the fixed rod 49 is pushed by the rotary vane 19 to turn about the rod 49 and kneaded by the cooperation of the rotary vane 19 and the fixed rod 49. In this way, the dough 81 is kneaded while turning about the fixed rod 49, and hence it does not turn around in the container 16 nor is it hit against the side wall of the container 16. Accordingly, the center of gravity of the dough hardly shifts and severe vibrations or loud noises are not produced. In the past, the rotary vane 19 had to be driven at a high speed of 400-800 rpm, but according to this embodiment, excellent dough can be obtained by driving the rotary vane 19 at a low speed of about 150-300 rpm, permitting sufficient reduction of vibrations and noises.

In the kneading step, the fixed rod 49 is subjected only to the force of the rotary vane 19 which tends to push it up through the dough 81, so that it is possible to eliminate the possibility of the fixed rod 49 coming off the side panel 16s of the container 16 by applying a simple stopper, though not shown, after insertion of the rod 49 into the holder 77. When baked bread is to be taken out of the container 16, the fixed rod 49 can easily be drawn out of the container 16. That is, the fixed rod 49 can be mounted and dismounted very easily. The length of the fixed rod 49 may be relatively small, as mentioned previously; for example, in the case of a container 16 for baking a pound of bread, the length of the rod 49 extending into the container 16 may be about 2.5 cm and its diameter may be 1 cm or so. A small hole of such a size in baked bread would not spoil its appearance. Further, the fixed rod 49 is of such small size that, by rotating the rotary vane 19 in the fermentation step, the dough 81 swollen by fermentation can be degassed and dropped off the rod 49 easily.

In the embodiment of FIG. 3, the rotary vane 19 can easily be lifted off from the rotary shaft 23 and can be mounted thereon with ease. During kneading the rotary vane 19 presses the dough 81 against the fixed rod 49 and, by the resulting reaction, it is pushed down, so that there is no possibility of the rotary vane 19 coming off from the rotary shaft 23. The bottom of baked bread is depressed to conform with the rotary vane 19, but the depression is only 8 cm long and about 1.5 cm deep and wide.

As the dough 81 is kneaded, its temperature rises. By completing the kneading step when the dough temperature has reached 27° to 28° C., excellent bread can be obtained and, in addition, subsequent control, for example, time control in the fermentation step is simplified. In the embodiment of FIG. 3, the dough temperature can be detected with a high degree of accuracy by detecting the temperature at the inner end of the fixed rod 49 with the temperature sensor 79.

In the case of stopping the kneading step upon detecting that the dough temperature has reached a predetermined value, it is possible to obtain particularly effective kneading results by keeping at a substantially constant value, i.e. 4° to 5° C. the temperature of the water 30 which is supplied from the water tank 31 to the container 16. When the temperature of the water 30 is high, the dough temperature reaches approximately 28° C. in a short time, and if the kneading is stopped then, the kneading is sufficient, and even if the kneading is continued excellent gluten cannot be obtained, resulting in the dough 81 becoming dull or lusterless. By putting cold water in the water tank 31 and ice in the ice box 46, as required, according to the weather conditions and the ambient temperature, however, the water 30 of preferable temperature can easily be obtained during kneading. According to our experiments, in the case where 200 g of water was held in the water tank 31 and 300 g, 200 g and 100 g of ice were put in the ice box 46 at room temperatures of 30, 25 and 20° C., respectively, the water 30 in the water tank 31 could be held at 4° to 5° C. after six hours. Accordingly, even if an expensive and bulky cooling device is not combined with the bread baking machine, it is possible to obtain good gluten by employing the simple and small structure of a heat-insulated water tank 31 having therein an ice box 46 and by putting therein some ice cubes available from a domestic refrigerator. In this way, cold water can be obtained for effectively producing lustrous dough.

The container 16 can be disassembled from the housing 11; in the illustrated embodiment, the mount 58 is attached to the bottom panel 16b of the container 16 so that the latter can easily be mounted on and dismounted from the housing 11. Since the mount 58 is required to withstand high temperatures during baking and severe mechanical shocks during kneading, it is made of metal. Accordingly, during baking heat of the bottom panel 16b of the container 16 is absorbed and radiated by the mount 58 and the heat is further transmitted to the cradle 62 and the base plate 18. This introduces the possibility of insufficient baking in the vicinity of the bottom panel 16b of the container 16. With the provision of the heat-insulating layer 57 between the bottom panel 16b and the mount 58 as shown in FIG. 3, however, it is possible to sufficiently bake bread uniformly throughout.

In the past, the opening of the container containing dough has been covered with a wet cloth to prevent the surface of the dough from getting dry during its fermentation. But, for full automatic operations from kneading to baking, it is very difficult to automatically cover the opening of the container with such a wet cloth. In the embodiment illustrated in FIG. 3, however, the container 16 is permitted to communicate with the outside only through the small hole 43 made in its lid 21, and hence it is held in a substantially sealed condition. Therefore, the steam generated from the dough 81 in the kneading and baking processes fills the container to prevent the surface of the dough 81 from drying. Moreover, since a small amount of excessive steam is gradually released through the small hole 43 together with the fermentation gas, this embodiment prevents steam generated from the dough 81 from condensing on the inside of the lid 21 into dewdrops which drip down therefrom onto the dough 81, thus ensuring to obtain excellent bread. The small hole 43 may be 2 to 4 mm in diameter in the case of using a container 16 of the size for baking a pound of bread. In addition, since the small hole 43 is made in the bottom of the shallow, dish-shaped recess 42 centrally thereof, the water 30 in the water tank 31 can easily be supplied to the container 16 through the small hole 43. In other words, there is no need of strict positioning of the pipe 33 on the container 16, permitting simplification of the fabrication and assembling of the bread baking machine.

Controller

Figure 6:
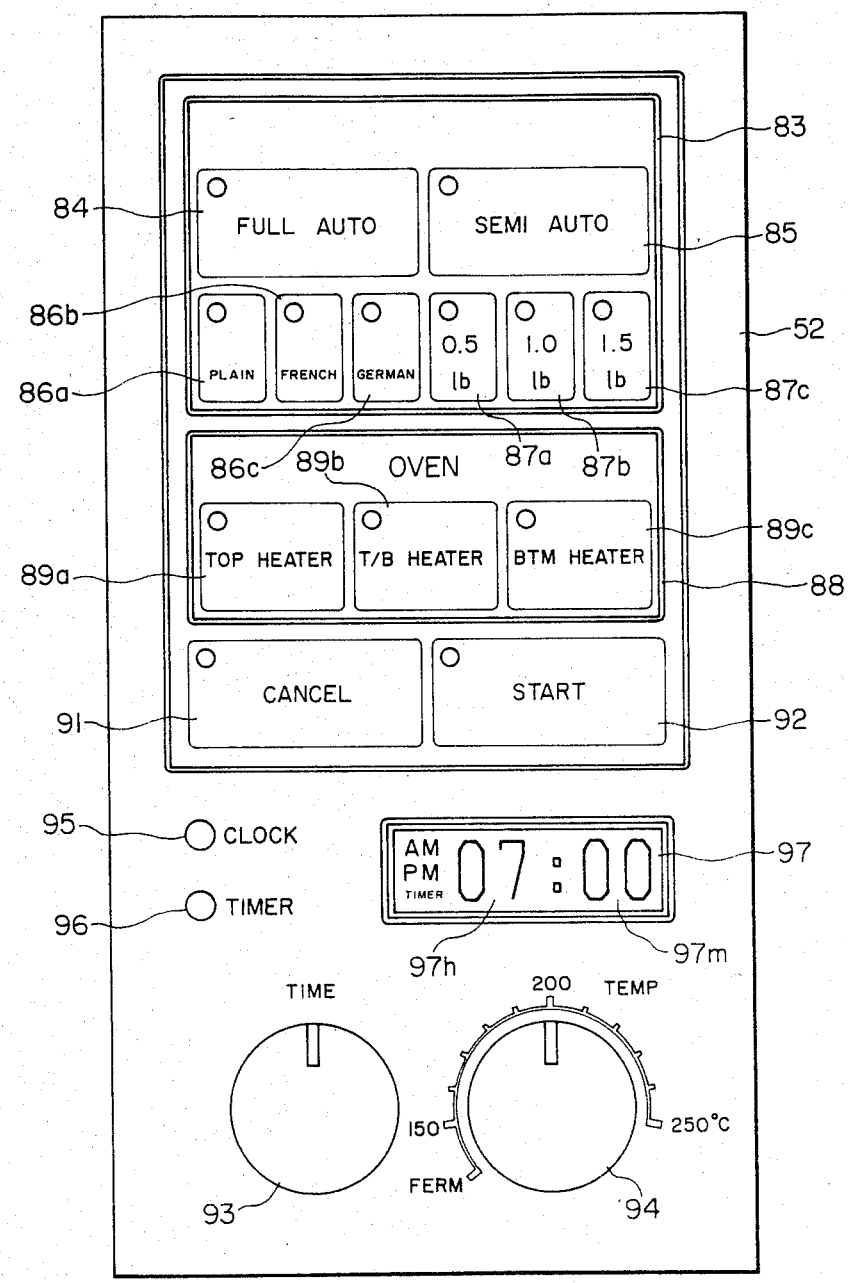
FIG. 6 is a front view showing an example of a control panel 52.

Next, a description will be given of parts related to control. FIG. 6 illustrates an example of the control panel 52 shown in FIG. 1. In a bread setting section 83 there are provided a full automatic key 84, a semi-automatic key 85, such bread setting keys as plain, French and German bread keys 86a, 86b and 86c and such quantity setting keys as 0.5, 1.0 and 1.5 pounds keys 87a, 87b and 87c. This example is designed so that it can also be used as an oven for cooking; therefore, top, top/bottom and bottom heater keys 89a, 89b and 89c are provided in an oven setting section 88. Further, cancel and start keys 91 and 92 are also provided. In this example, membrane switches are used for key inputting, and there are provided, under films indicating the abovesaid keys, flat, plate-shaped switches which are each activated when the overlying film is depressed. It is also possible to replace the membrane switches with pushbutton switches, in which case their pushbuttons are used in place of the abovesaid keys. On the control panel 52 there are further provided a time setting knob 93, a temperature selecting knob 94, a clock setting knob 95, a timer knob 96 and a time display 97, such, for example, as a liquid crystal display.

Figure 7:
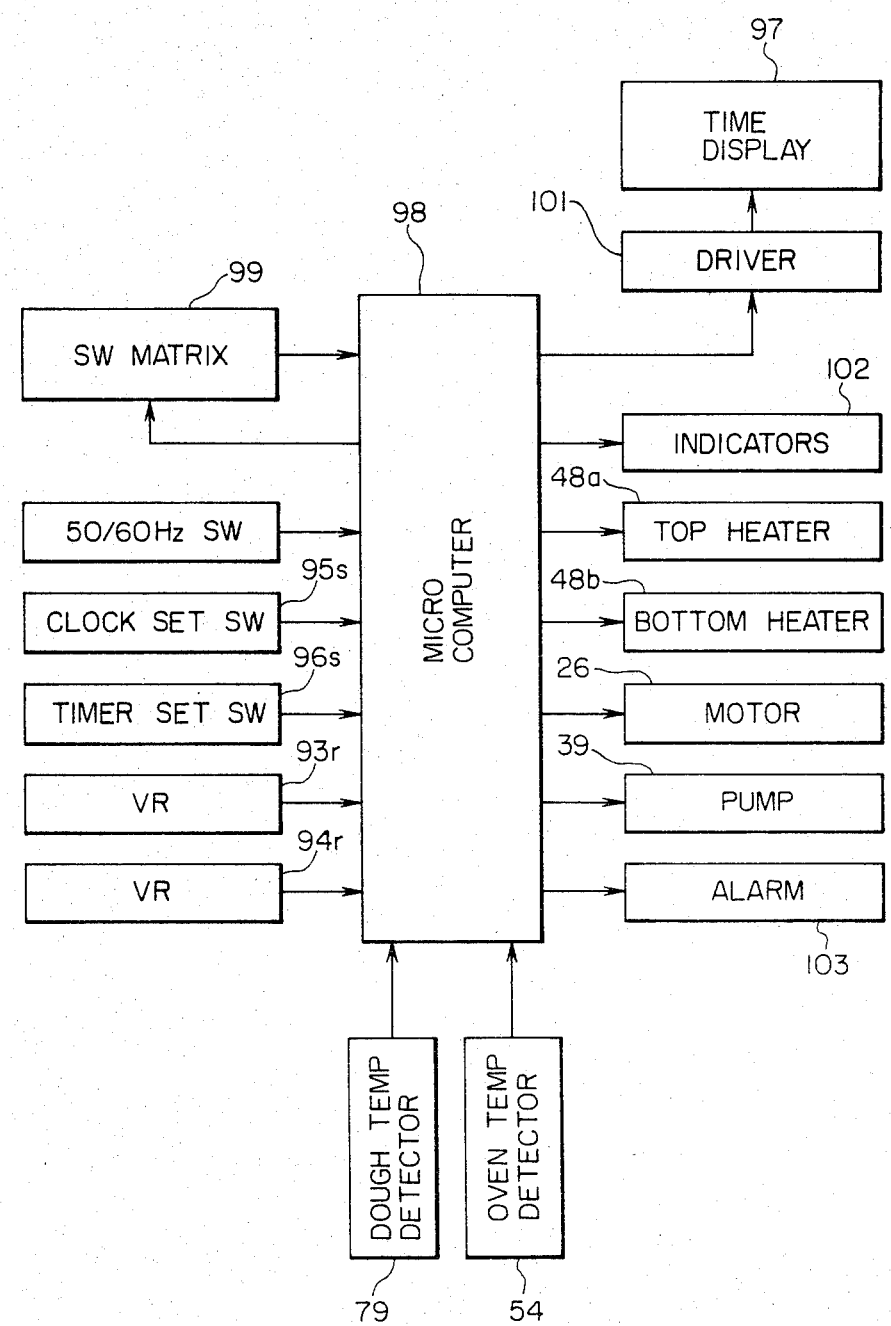
FIG. 7 is a block diagram illustrating an example of a controller 53 which is formed by a microcomputer, and its input/output relation.

The controller 53 in FIG. 1 is formed by a microcomputer 98, as shown in FIG. 7. The switches which are activated by depressing the keys of the bread setting section 83 and the oven setting section 88, the cancel key 91 and the start key 92 are provided in the form of a switch matrix 99, and when a selected one of the keys are depressed, data indicating the depressed key is input into the microcomputer 98. Switches 95s and 96s which are controlled by the clock setting button 95 and the timer button 96, respectively, are also connected to the microcomputer 98 to input thereto their state of control. When the time setting knob 93 is turned, a variable resistor 93r is adjusted, and when a temperature is set by turning the temperature setting knob 94, a variable resistor 94r is adjusted correspondingly. The resistance values of the variable resistors 93r and 94r thus adjusted are converted into digital form for input into the microcomputer 98. Further, the temperature sensor 54 in the heating chamber 40 in FIG. 1 and the temperature sensor 79 in the fixed rod 19 in FIG. 3 are connected to the microcomputer 98.

The microcomputer 98 provides to a driver 101 data to be displayed on the time display 97 in FIG. 6 and controls the corresponding one of light emitting diodes 102 provided at the positions of the various keys for indicating the output from the microcomputer 98. The top and bottom heaters 48a and 48b, the motor 26 and the pump 39 are also placed under the control of the microcomputer 98. An alarm buzzer 103 is also connected to the microcomputer 98.

The microcomputer 98 has incorporated therein a timing program and performs the same operation as a clock using an ordinary microcomputer, and its clock setting operation is also the same as usual. A brief description will be given of this. Depressing the clock setting button 95 once, an AM or PM display and an hour display 97h are turned ON and OFF and, in this state, the time setting knob 93 is turned to the right or left depending on whether to put the clock forward or back, by which the hour display 97h undergoes sequential changes correspondingly. Depressing again the clock setting button 95 when the hour display has reached the time desired to set, a minute display 97m of the time display 97 is turned ON and OFF. In this state the time setting knob 93 is turned to set the minute display and then the clock setting button 95 again, by which the ON-OFF display of the minute display 97m is stopped. The clock operates on the time thus set and the time is displayed on the time display 97.

Next, a description will be given of the automatic bread baking process.

At first, the rotary vane 19 and the fixed rod 49 are set in the container 16 which has been removed from the housing 11 and then the ingredients of bread, that is, in the case of baking a pound of plain bread, 300 gr of wheat flour, 4.8 gr of salt, 9 gr of butter, 6 gr of skim milk (powdered milk), 15 gr of sugar and 4.8 gr of instant dry yeast, are put in the container 16 and the lid 21 is put thereon. Water (200 gr in the case of a pound of plain bread) is poured into the water tank 31; if necessary, cold water is used, or ice is put in the ice box 46. The container 16 is set in the housing 11 and the temperature sensor 79 is connected via the connector 50 to the controller 53. Then the full automatic key 84 on the control panel 52 is depressed. In consequence, the light emitting diodes at the positions of the full automatic key 84, the plain bread key 86a and the 1.0 pound key 87b are lighted. In the case of baking French or German bread, the corresponding key 86a or 86c is depressed and in the case of changing the amount of bread desired to bake, the 0.1 or 1.5 pound key 87a or 87c is depressed correspondingly.

This is followed by setting of the time desired to complete baking. This setting is effected in the same manner as the aforementioned clock setting, but in this case the timer button 96 is used in place of the clock setting button 95. At this time, a timer is displayed in the time display 97. Finally the start key 92 is depressed.

Figure 8A:
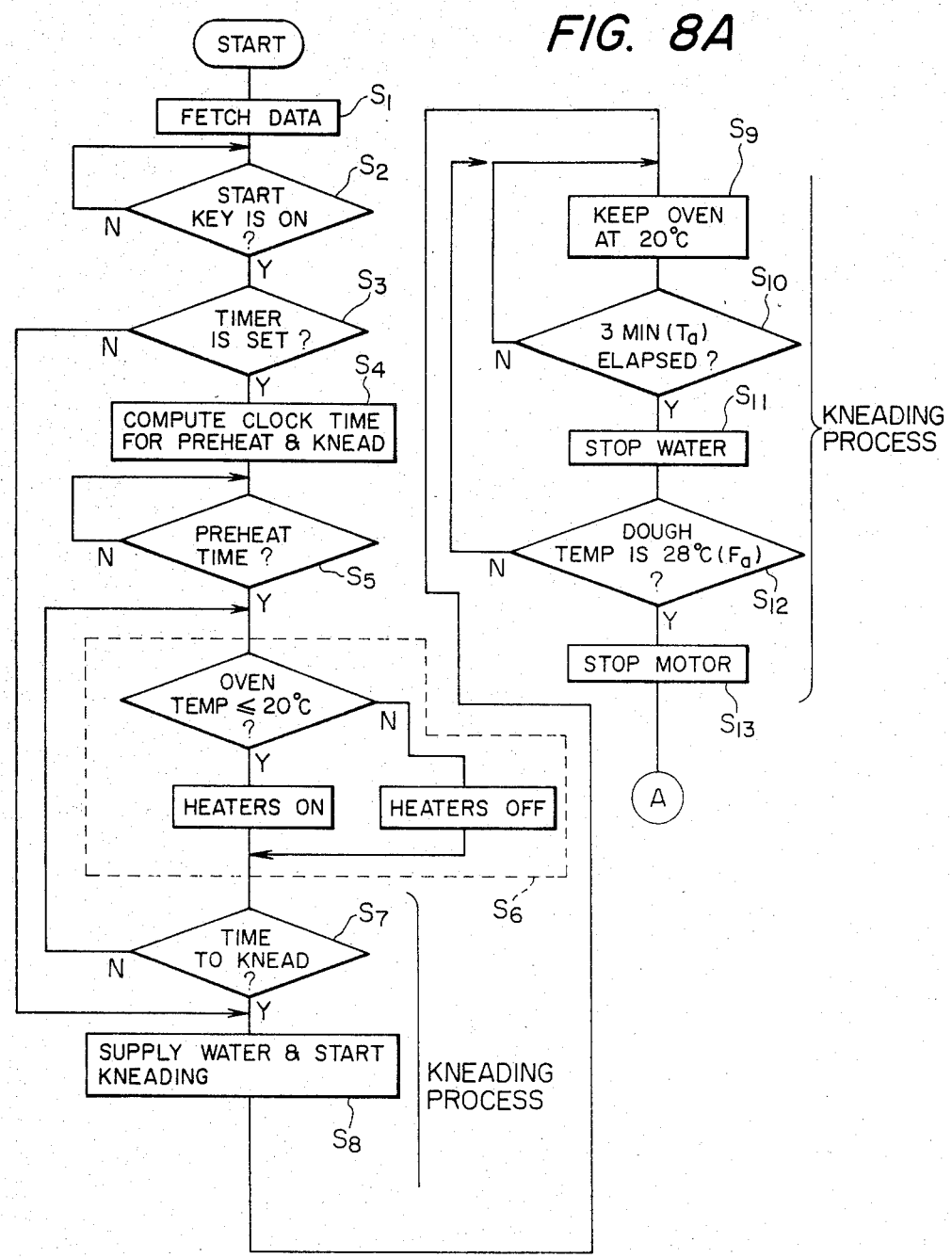
FIGS. 8A and 8B are a flowchart showing an example of processing control by the controller 53.
Figure 8B:
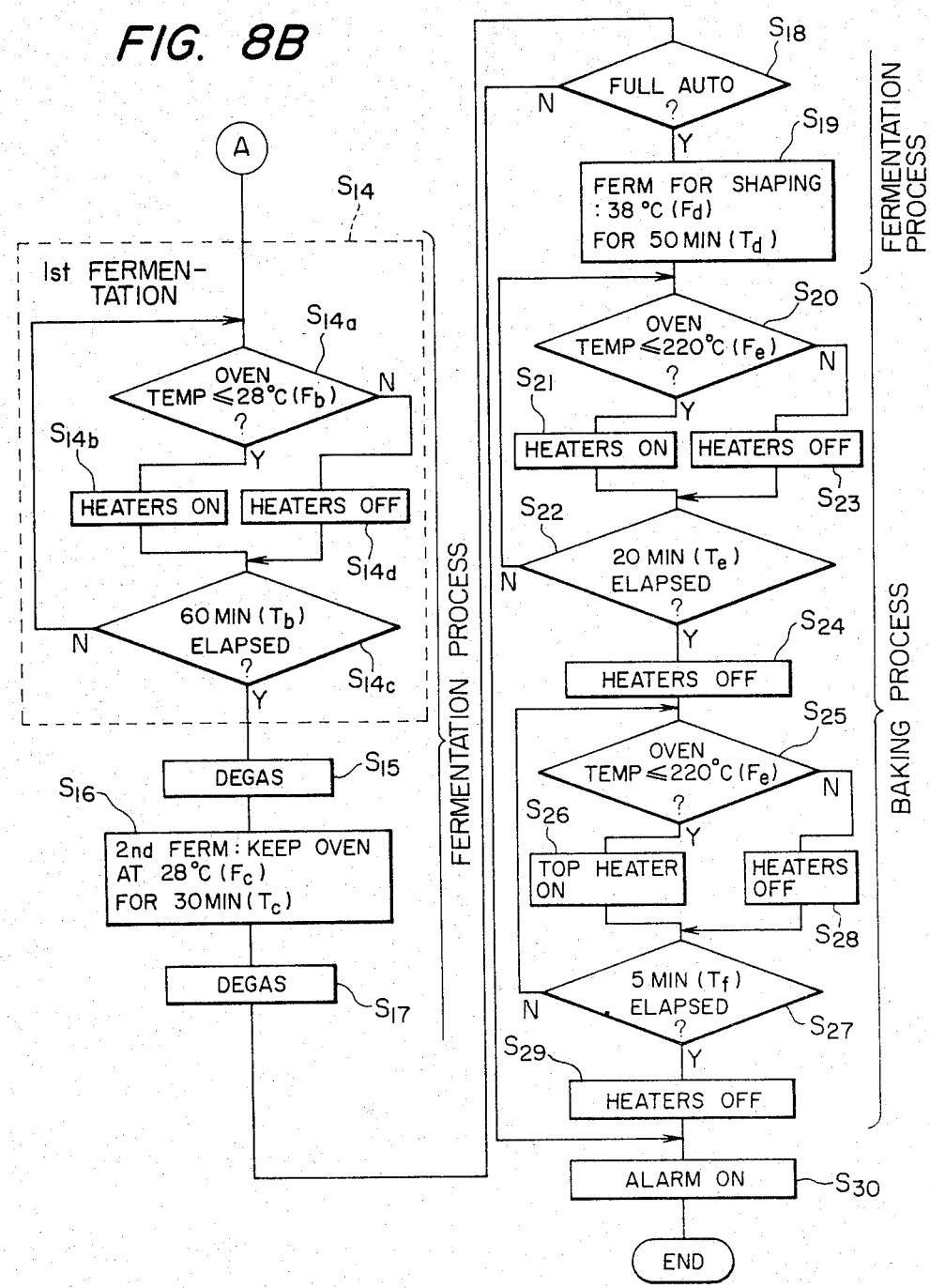

The processing operation by the controller 53 is performed, for example, as shown in the flowchart of FIGS. 8A and 8B. In step $S_1$ after starting the controller 53, data on the keys depressed on the control panel 52 and the time set by the timer are input into the controller 53 in the order of performance of the operations therefor and are stored in predetermined areas of a RAM in the microcomputer 98. After inputting of these conditions, the controller 53 waits for the depression of the start key 92 in step $S_2$. Upon depression of the start key 92, it is decided in step $S_3$ whether the timer has been set, and if so, preheating and kneading start time points are computed in step $S_4$. The kneading start time point is calculated from a required time $T_0$ which is determined by the kind and the amount of bread and the time desired to complete the baking of the bread, entered from the control panel 52, and the time an hour previous to the kneading start time is calculated to obtain the preheating start time. For example, when the plain bread key 86a and the 1.0 pound key 87b have been depressed, the time three hours and ten minutes (the required time $T_0$) previous to the time desired to finish the baking is the kneading start time and the time an hour previous thereto is the preheating start time.

In step $S_5$ it is decided whether the time of the incorporated clock has reached the calculated preheating start time, and if so, the process proceeds to step $S_6$, in which the interior of the heating chamber 40 is held at a constant temperature, for instance, 20° C. It is decided, on the basis of the output from the temperature sensor 54 in the heating chamber 40, whether the temperature therein is below 20° C., and if so, i.e. heater 48 (the both heaters 48a and 48b) is turned ON. In step $S_7$ it is checked whether the aforesaid calculated kneading start time has come or not, and if not, the process returns to step $S_6$, in which it is decided whether the temperature in the heating chamber 40 is under 20° C.

or not. If not, the heater 48 is turned OFF and the process proceeds to step $S_7$. In this way, when the preheating start time comes, the operation for holding the temperature in the heating chamber 40 at the predetermined value is carried out.

When it is decided in step $S_7$ that the kneading start time has come, the process proceeds to step $S_8$, starting the kneading operation. At first, the motor 26 is driven and the pump 39 is also driven to supply the water 30 from the water tank 31 to the container 16. Accordingly, the ingredients of bread in the container 16 are kneaded. In step $S_9$ a process for retaining the temperature in the heating chamber 40 at a predetermined value as in step $S_6$ is carried out, and in step $S_{10}$ it is checked by, for example, the incorporated timer, whether the kneading has taken place for a predetermined time Ta, for instance, three minutes. If not, the process goes back to step $S_9$, and if three minutes have elapsed, the driving of the pump 39 is stopped in step $S_{11}$. In step $S_{12}$ it is checked by referring to the detected output of the temperature sensor 79 in the fixed rod 49 whether the temperature of the dough 81 has reached a predetermined value Fa, for example, 28° C. If not, the process returns to step $S_9$, and if yes, the rotation of the motor 26 is stopped in step $S_{13}$, completing the kneading operation, which is followed by the fermentation step.

The fermentation process starts with primary fermentation of the dough 81 in step $S_{14}$. In step $S_{14a}$ it is checked whether the temperature in the heating chamber 40 is held at a predetermined value Fb, that is, below 28° C. in the case of baking a pound of plain bread. If the temperature is lower than 28° C., then the heater 48 is turned ON in step $S_{14b}$ and the process proceeds to step $S_{14c}$. When the temperature is decided higher than 28° C., the heater 48 is turned OFF in step $S_{14d}$ and the process proceeds to step $S_{14e}$. In step $S_{14e}$ it is checked whether a predetermined time Tb or sixty minutes in the abovesaid case have passed since the start of the primary fermentation process, and if not, the process goes back to step $S_{14a}$. When sixty minutes have elapsed, the primary fermentation is completed and the process proceeds to step $S_{15}$, in which the motor 26 is driven for a short period of time $t_b$ (eight seconds in the abovesaid example), degassing the dough 81 swollen by fermentation. Next, in step $S_{16}$ the interior of the heating chamber 40 is maintained at a predetermined temperature Fc (28° C. in the above example) for a predetermined period of time (30 minutes in the above example), thereby effecting secondary fermentation. The temperature control for the secondary fermentation is carried out in the same manner as in the case of the primary fermentation. Upon completion of the secondary fermentation, the motor 26 is driven for a predetermined period of time $t_c$ (eight seconds in the above example) in step $S_{17}$, degassing the dough 81.

Following this, the process proceeds to step $S_{18}$ and it is checked whether the full automatic key 84 was depressed in step $S_1$. In the case of the full automatic mode of operation, the heating chamber 40 is held at a predetermined temperature Fd (38° C. in the above example) for a predetermined period of time $T_d$ (50 minutes in the above example) in step $S_{19}$, performing fermentation of the dough 81 for the shaping thereof. The fermentation step terminates with the fermentation for shaping and is followed by the baking step.

The baking operation starts with step $S_{20}$ in which it is checked whether the temperature in the heating chamber 40 is lower than a predetermined value Fe (220° C. in the above example) or not. If yes, the top and bottom heaters 48a and 48b are turned ON in step $S_{21}$. If it is decided in step $S_{20}$ that the temperature in the heating chamber 40 is higher than 220° C., then the heaters 48a and 48b are turned OFF in step $S_{23}$, which is followed by step $S_{23}$. In step $S_{22}$ it is checked whether a predetermined period of time Te (20 minutes in the above example) has passed since the start of the baking process. If not, the process returns to step $S_{20}$, and if yes, the process proceeds to step $S_{24}$, turning OFF the heaters 48a and 48b. In the next step $S_{25}$ it is decided whether the temperature in the heating chamber 40 is higher than 220° C. or not. When the temperature is below 220° C., the process proceeds to step $S_{26}$, in which the bottom heater 48b alone is turned ON, and the process proceeds to step $S_{27}$. In the case where it is decided that the temperature is above 220° C., the bottom heater 48b is turned OFF, and then the process proceeds to step $S_{27}$. In step $S_{27}$ it is checked whether a predetermined period of time Tf (five minutes in the above example) has passed after completion of step $S_{22}$. If five minutes have not passed yet, the process goes back to step $S_{25}$. When it is decided in step $S_{27}$ that five minutes have passed after the end of step $S_{22}$, the top and bottom heaters 48a and 48b are turned OFF in step $S_{29}$, and in step $S_{30}$, the buzzer is rung for a predetermined period of time to indicate completion of the baking. The baking operation terminates with step $S_{30}$.

FIGS. 9A, B and C are timing charts of the above-described control of the temperature of the heating chamber 40, the motor 26 and the pump 39. In step $S_{15}$ in the fermentation process it is also possible to employ what is called a remix dough method which involves remixing of the dough 81 by driving the motor 26 over a predetermined period of time exceeding the time necessary for degassing the dough 81, for example, five minutes. When it is desired to immediately put the bread baking machine in operation, the time desired to complete baking is not set in the preparatory step. Accordingly, it is decided in step $S_3$ in FIG. 8A that the timer has not been set, and the operation immediately proceeds to step $S_7$ and after the temperature of the heating chamber 40 is controlled to remain at 20° C., the kneading operation starts.

For the abovesaid process control, a bread setting flag area 107 is provided in a RAM 106 of the microcomputer 98 (FIG. 10), and there are stored in the area 107 flags 107a to 107h which respectively correspond to the full automatic key 84, the semi-automatic key 85, the plain bread key 86a, the French bread key 86b, the German bread key 86c, the 0.5 pound key 87a, the 1.0 pound key 87b and the 1.5 pound key 87c and each of which is made a "1" or "0" depending upon whether the corresponding one of the keys is depressed or not. Similarly, flags 108a, 108b and 108c are stored in an area 108 of the RAM 106 corresponding to the top heater key 89a, the top/bottom heater key 89b and the bottom heater key 89c, respectively. The time point (or time) entered by depressing the timer button 96, for example, the baking completion time, is stored in an area 109 of the RAM 106. The preheating start time and the kneading start time computed in step $S_4$ in FIG. 8A are stored in areas 111 and 112 of the RAM 106, respectively. An area 113 of the RAM 106 is used for the incorporated timer which is employed for deciding the lapse of various times. The required time $T_0$, the quantity of water supplied and the temperature and period for each step in the fermentation process differ with the kind and amount of bread desired to bake. Accordingly, their values are prestored, as a table such as shown in FIG. 11, corresponding to the state of the flags 107c to 107h indicating the kinds and amounts of bread. With such an arrangement, in the case of baking a pound of plain bread, the flags 107c and 107g are 1s and the contents of state 1 are read out for controlling the entire bread baking operation.

When the ambient temperature is high, as in the summer, the kneading process may sometimes be carried out in the following manner. For example, the dough is kneaded unconditionally for 15 minutes, and if the dough temperature is above 28° C. after 15 minutes, the dough is no longer kneaded. If the dough temperature is below 28° C., the dough is further kneaded until its temperature rises to 28° C. Alternatively, if the dough temperature reaches 28° C. within 15 minutes after the start of kneading, then the dough is kneaded until the dough temperature rises to 32° C. In the case where the lowest dough temperature during five minutes after the start of kneading is 21° C. or above, the kneading is finished at the moment when the dough temperature has exceeded the abovesaid lowest value plus 8° C. The dough is cooled by the cold water 30 supplied to the container 16 simultaneously with the start of kneading and the dough temperature is reduced to a minimum value in one to two minutes.

In the operation shown in FIGS. 8A and 8B, if the semi-automatic key 85 is depressed, the operation proceeds from step $S_{18}$ to step $S_{29}$. Consequently, the operation terminates with degassing after the secondary fermentation. In the case of using the baking machine only for performing the fermentation, dough is placed in the container 16, any one of the top, top/bottom and bottom heater keys is depressed, the timer button 96 is depressed to set the fermentation time by the time setting knob 93 and the temperature knob 94 is turned to set a desired temperature. Thereafter, the start key 92 is depressed.

Modified Embodiments

Figure 12:
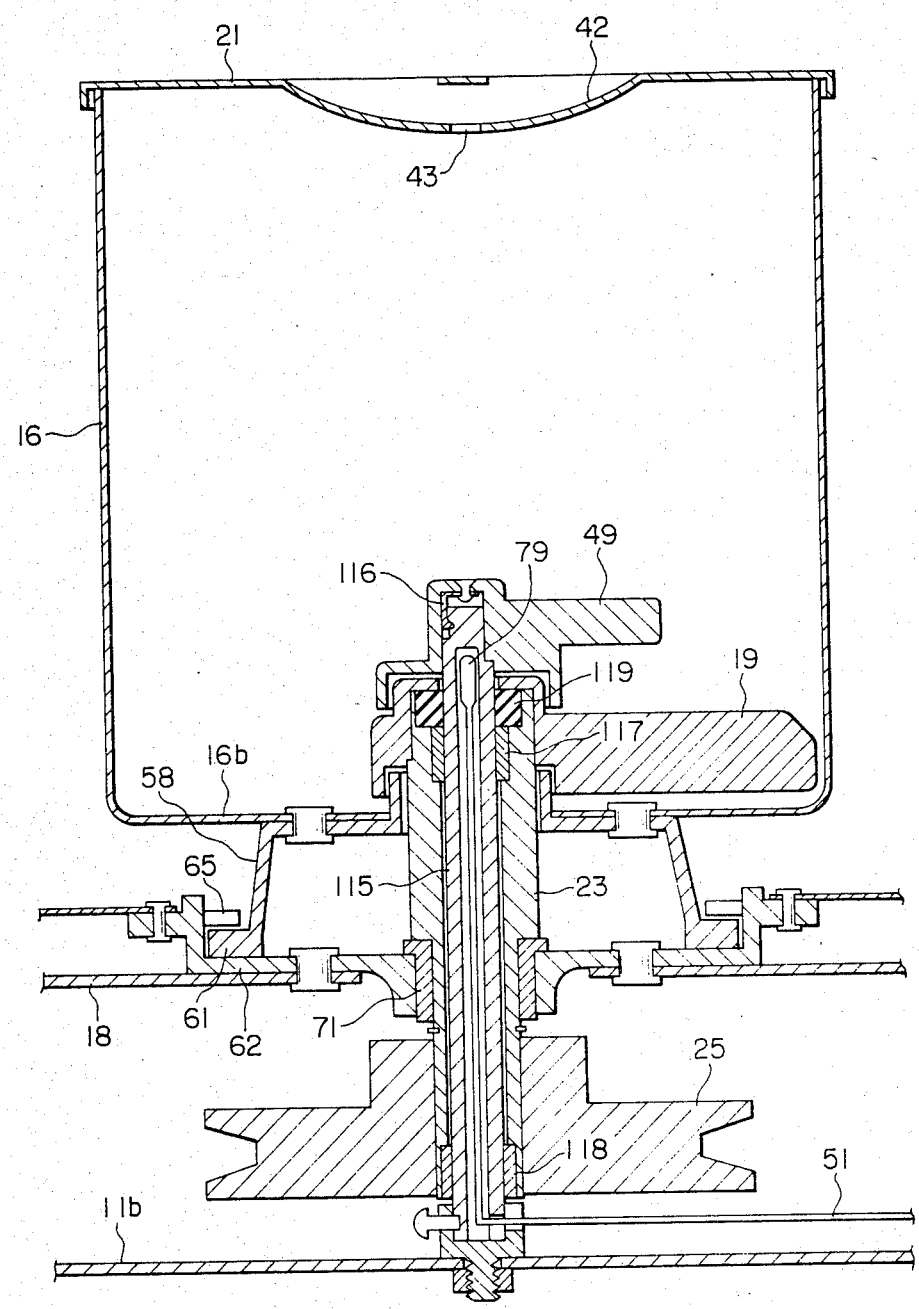
FIG. 12 is a sectional view illustrating a modified form of the machine of the present invention in which the fixed rod is held at the center of a rotary shaft.

The fixed rod 49 may also be held in the container 16 at the center of its bottom, as shown in FIG. 12 in which the parts corresponding to those in FIG. 3 are identified by the same reference numerals. As the rotary shaft 23 a sleeve shaft is used which is not divided into upper and lower portions. The sleeve shaft is rotatably supported by a bearing 71 and inserted in the container 16. The rotary shaft 23 has inserted therethrough a stationary shaft 115, the lower end of which is fixed to the bottom panel 11b of the housing 11. The upper end of the stationary shaft 115 extends into the container 16 and one end portion of the fixed rod 49 is detachably mounted on the projecting end portion of the stationary shaft 115. This can be achieved by the same structure as that for mounting the rotary vane 19 on the rotary shaft 23. A plate spring 116 is engaged with the stationary shaft 115 and inserted in the fixed rod 49 on the side opposite from the direction of its extension. With the rotation of the rotary vane 19, the fixed rod 49 is thrusted by the dough; but the thrusting force is a pivotal force in the direction lying in the plane containing the rod 49 and the stationary shaft 115, so that the fixed rod 49 does not easily come off during kneading. When lifted up vertically, however, the fixed rod 49 can be disassembled from the stationary shaft 115 relatively easily. In this embodiment, the stationary shaft 115 has a central bore, at the inner end of which the temperature sensor 79 is disposed. Bearings 117 and 118 are interposed between the stationary shaft 115 and the rotary shaft 23. A seal 119 is packed between the upper end portion of the rotary shaft 23 and the stationary shaft 115. The heat-insulating material need not always be interposed between the container 16 and the mount 58 as in this embodiment.

Figure 13:
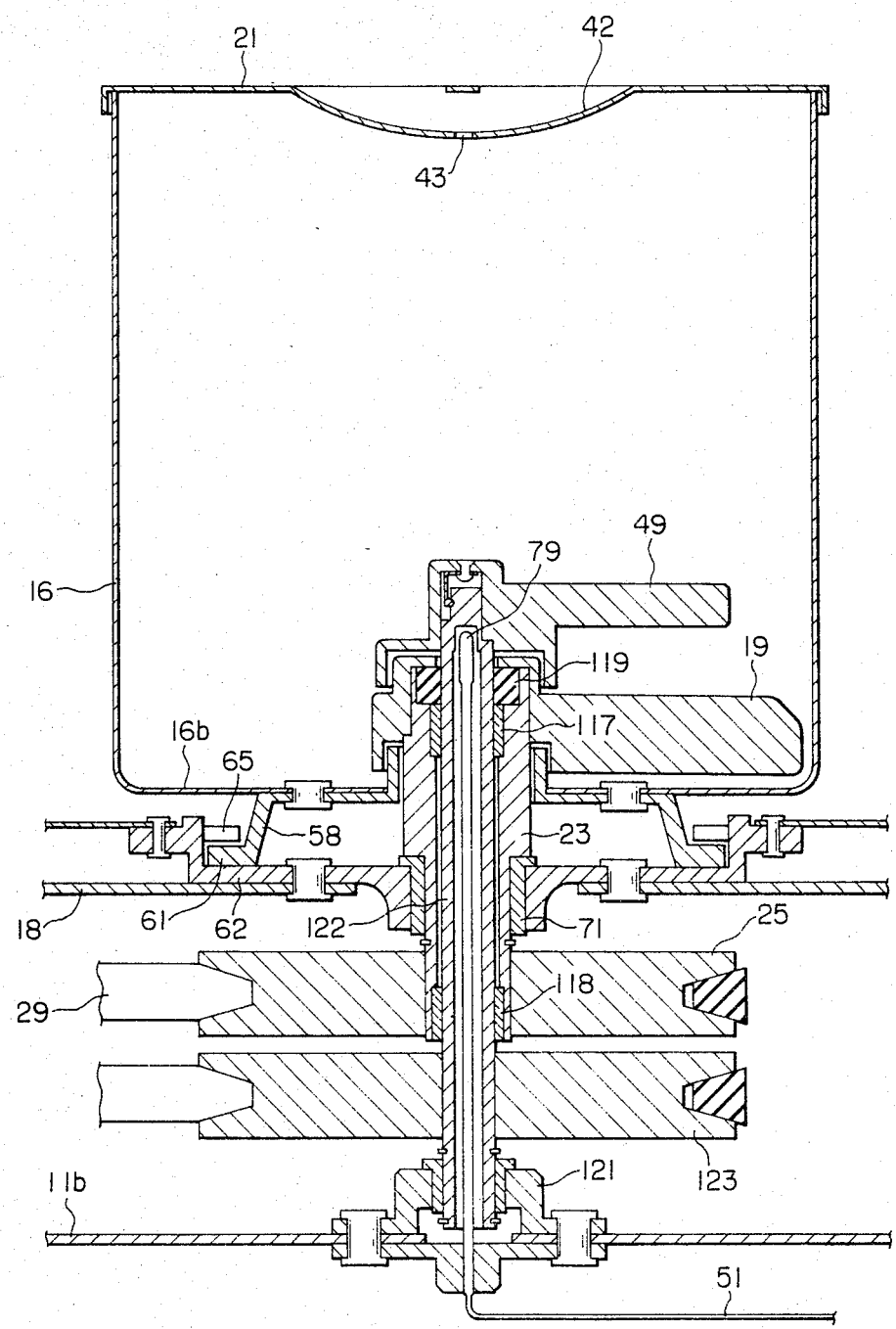
FIG. 13 is a sectional view illustrating another modification of the present invention in which the fixed rod is also made to rotate.

It is also possible to employ a structure of the type shown in FIG. 13 in which the stationary shaft 115 in FIG. 12 is rotatably supported, as an inner rotary shaft 122, by a bearing 121 and a pulley 123 is mounted on the rotary shaft 122 to drive the fixed rod 49. In this case, by driving the fixed rod 49 and the rotary vane 19 in opposite directions, dough can be kneaded at a lower rotational speed, for example, 100 rpm or so. The rotary vane 19 and the fixed rod 49 may also be driven in the same direction but at different speeds which differ by approximately 200 rpm.

Figure 14:
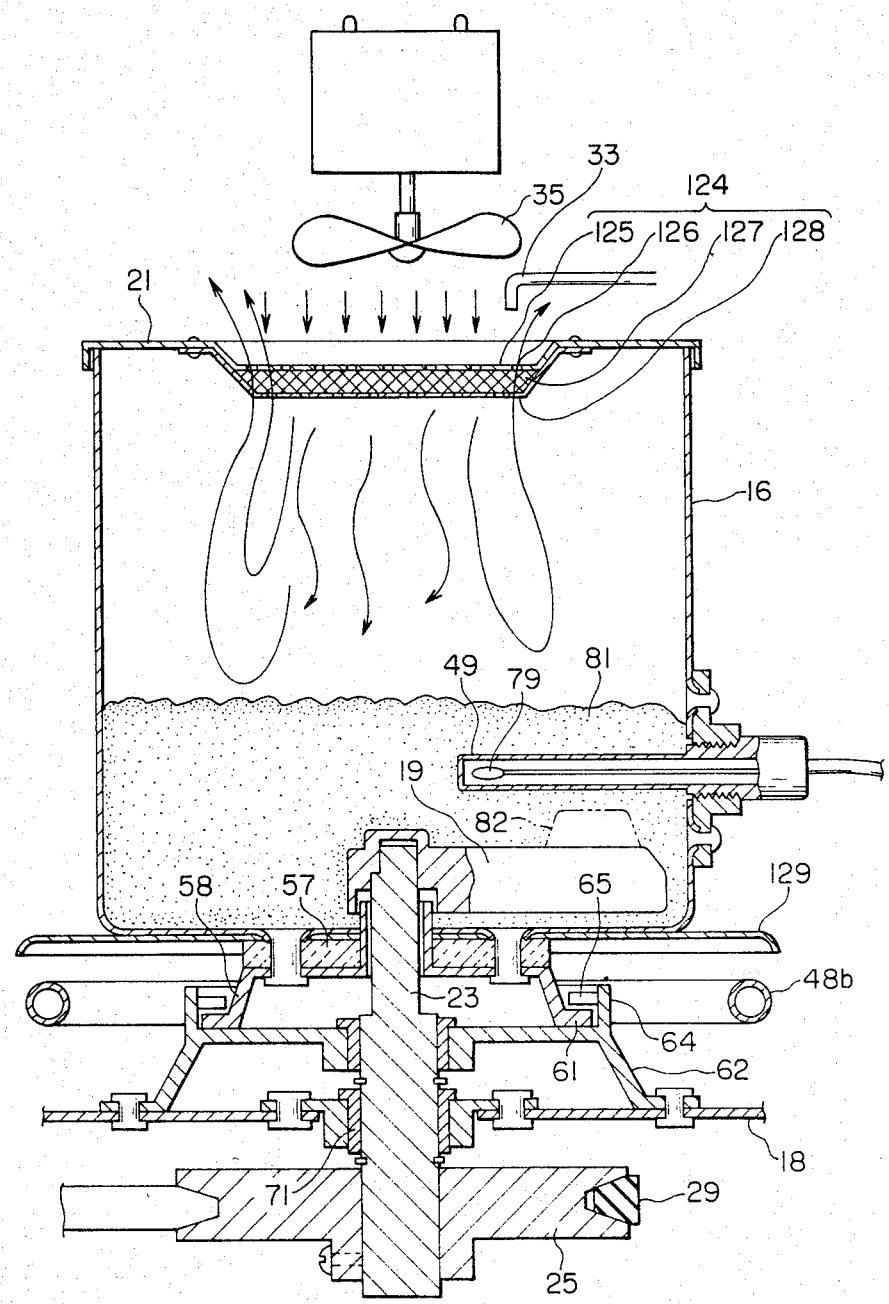
FIG. 14 is a sectional view illustrating another modification of the present invention in which a water-retaining aperture 124 is made in the container 16.

A water-retaining opening 124 may also be made in the top panel of the container 16, as shown in FIG. 14. In this embodiment, a shallow recess 125 is made in the central portion of the lid 21 of the container 16 and numerous pores 126 are provided in the bottom of the recess 125. A heat-resisting fiber member 127 is mounted on the lid 21 to close the pores 126. In this example, a doubling plate 128 also having pores is attached to the lid 21 in adjacent but spaced relation to the recess 125, and the fiber member 127 is packed in the space defined between the recess 125 and the doubling plate 128. As the fiber member 127, for example, heat-resisting glass fiber or tetrafluoroethylene is used. The water 30, which is supplied to the water-retaining aperture 124 through the pipe 33 in the manner described previously with respect to FIG. 1, drops into the container 16 through the water-retaining aperture 124, and at the same time, the water is impregnated into the fiber member 127. Consequently, in the subsequent fermentation process, the fiber member 127, though spaced apart from the dough 81, produces substantially the same effect as would be obtained by covering the container with a wet cloth as in the past; therefore, the dough 81 does not get too dry or sticky. The water-retaining opening 124 is of particular utility when employed for baking French bread which requires relatively high dampness. In the kneading step, the situation may sometimes arise where the dough 81 twisted around the fixed rod 49 stays mainly on its upper side and remains out of the circle of rotation of the rotary vane 19, but this can be prevented by providing on the free end portion of the rotary vane 19 a small projection 82 as indicated by the broken line in FIG. 14 so that it strikes against the dough on the underside of the rod 49 to cause it to turn around the rod 49.

Further, in the example shown in FIG. 14, a circular heat-absorbing plate 129 made of a material of high heat conductivity, for instance, aluminum, is interposed between the heat-insulating layer 57 and the bottom panel 16b of the container 16. The heat-absorbing plate 129 is of such a size that the bottom panel 16b substantially inscribes it. In the baking process the heat-absorbing plate 129 effectively absorbs and transmits heat from the bottom heater 48b to the bottom panel 16b, making up for the loss of heat escaping from the mount 58 and the rotary shaft 23.

Moreover, in the embodiment illustrated in FIG. 14, a cooling fan 35 is provided above the container 16. In the case where room temperature is, for example, about 30° C. or higher, and the water 30 supplied to the container 16 is not cooled, the cooling fan 35 is driven a little after the start of mixing of the dough with the water 30. An air current produced by the cooling fan 35 passes through the water-retaining opening 124 into the container 16, and it cools the dough 81 and promotes vaporization of water in the water-retaining aperture 124 to take the heat of vaporization away therefrom, suppressing a temperature rise of the dough 81. For example, where room temperature is 30° C. and the dough 81 is mixed with uncooled water 30, the dough temperature will soon rise to 33° C. and then increase as high as 36° C., in which case no gluten can be produced. With the provision of the cooling fan 35, however, the dough temperature can be controlled to around 3° C., so that gluten, though not as good as in the case where the kneading starts at lower temperatures, can be produced, permitting eatable bread to be obtained.

Figure 15:
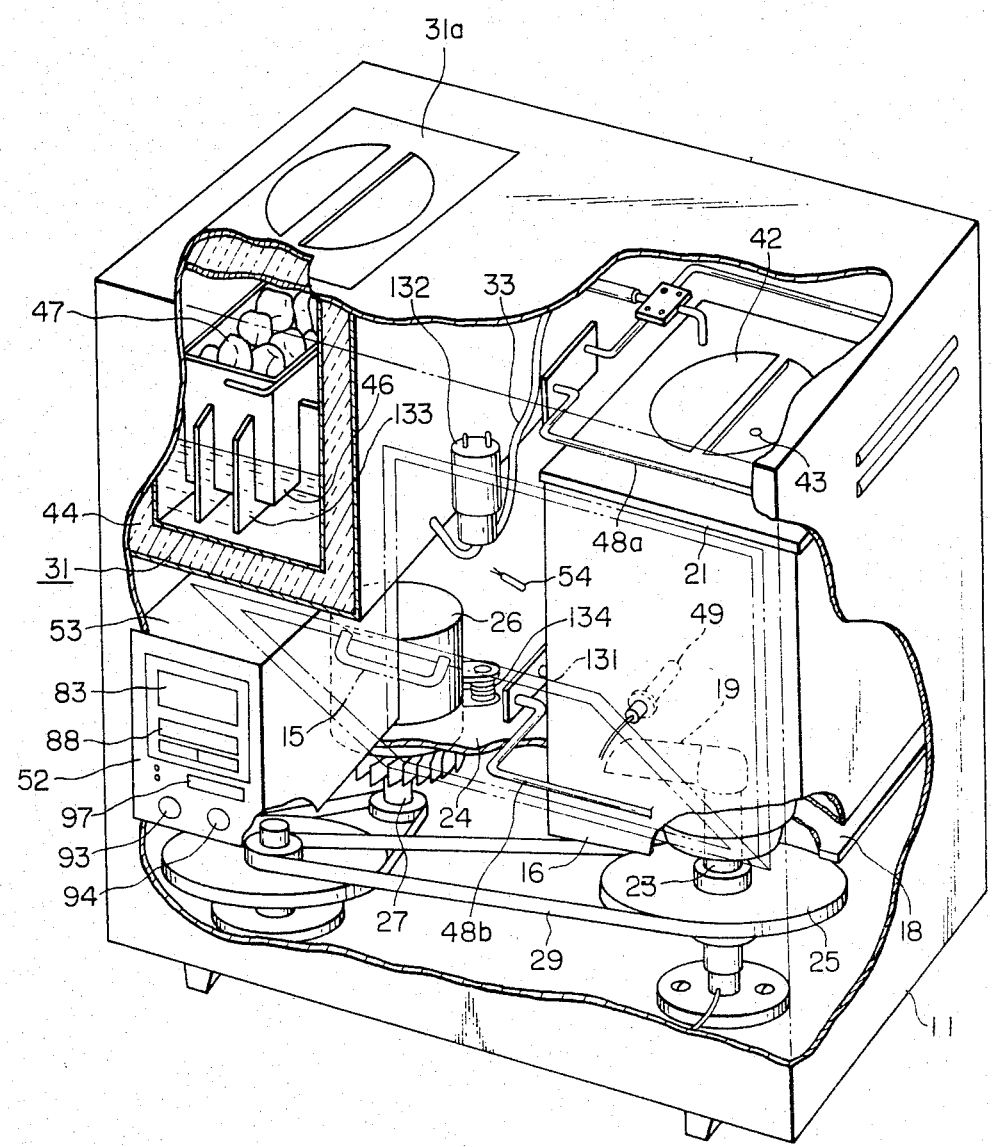
FIG. 15 is a perspective view illustrating another modification of the present invention in which an opening is made in the front of the baking machine for putting the container in and out of the machine.

FIG. 15 illustrates another modified form of the present invention, in which a part of the front panel of the housing 11 is removed to provide an opening that can be closed by a flap 131 and through which the container 16 can be put in and out of the housing 11 in a lateral direction. Moreover, a radiation fin 133 is mounted on the outer periphery of the ice box 46 in the water tank 31. The motor 26 may also be mounted on the base plate 18 through anti-shock means 134. In FIG. 15, the parts corresponding to those in FIGS. 1 to 3 are identified by the same reference numerals.

Figure 16:
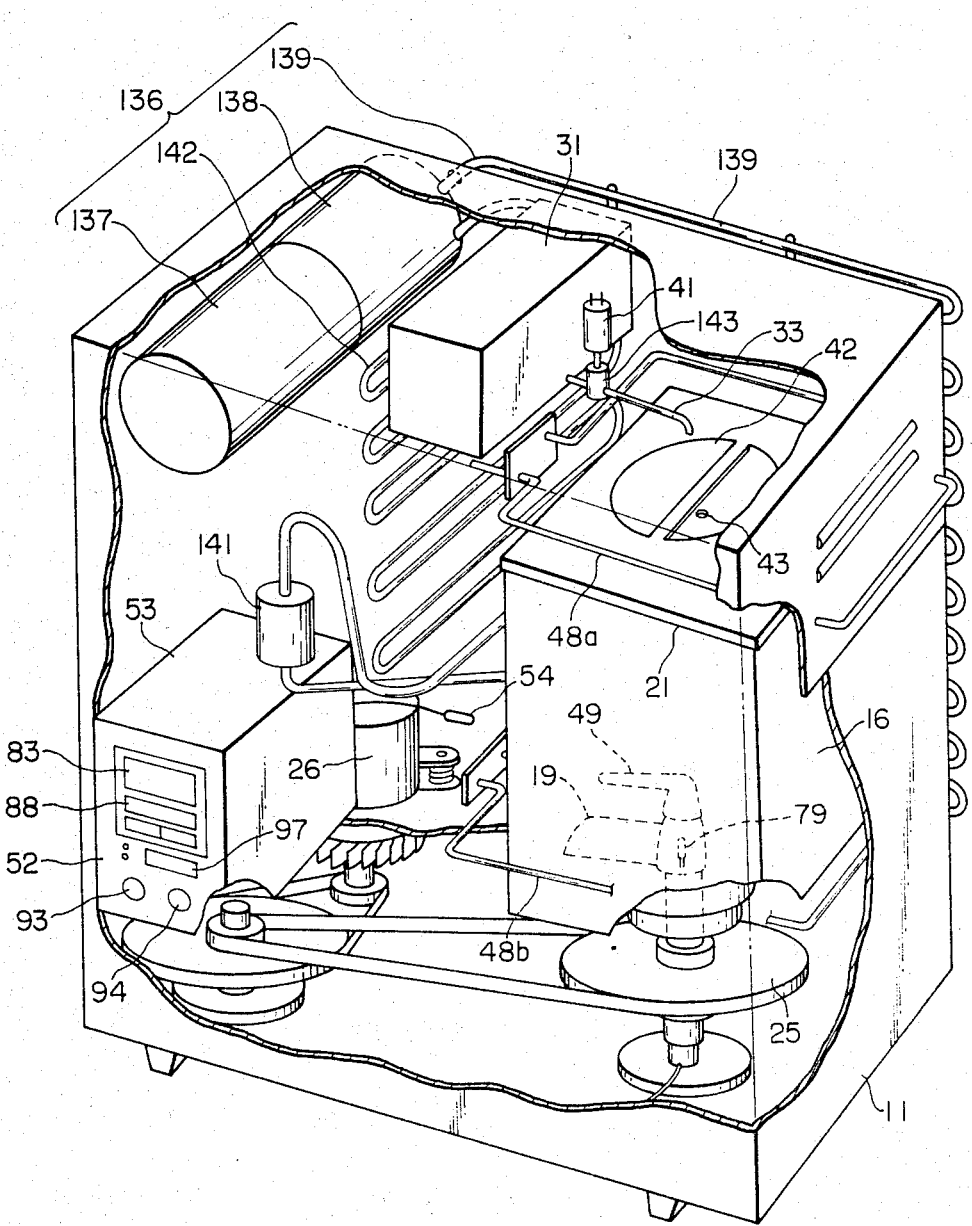
FIG. 16 is a perspective view illustrating still another modification of the present invention in which a refrigerator is incorporated in the baking machine.

FIG. 16 illustrates still another modified form of the present invention, in which a refrigerator 136 is provided in the housing 11. In the refrigerator 136 a compressor 138 is driven by a motor 137 to compress a refrigerant, which is condensed by a condenser 139, and the condensed refrigerant is expanded by an expansion valve 114 and then the expanded refrigerant passes through a vaporizer 142 to absorb the surrounding heat. The vaporizer 142 is stretched in the form of a pipe throughout the housing 11 to absorb heat therein. The condenser 139 is mounted on the outside of the housing 11 to release to the outside the heat absorbed by the vaporizer 142. The temperature in the housing 11 is detected by the temperature sensor 54, and when it is, for example, higher than 15° C., the refrigerator 136 is activated to maintain the interior of the housing 11 at 15° C., by which the dough 81 and the water 30 in the water tank 31 are always held at 15° C. By starting the kneading of the dough 81 at this temperature and stopping the kneading when the dough temperature has reached, for instance, 28° C., it is possible to produce gluten good enough to bake excellent bread. In the embodiment shown in FIG. 16, there is provided a plunger solenoid 41 to control opening and closing of a valve 143, thus controlling the water supply to the container 16 from the water tank 31. In this case the water tank 31 must be disposed at a higher position than the container 16.

In the foregoing embodiments, the rotary vane 19 has been described as a single vane; however, it is also possible to provide a plurality of vanes extending in radial directions.

It will be apparent that many modifications and variations may be effected without departing from the scope of the novel concepts of the present invention.

What is claimed is:

1. An automatic bread baking machine comprising:
   housing;
   a container removably mounted in the housing, for containing the ingredients of bread;

water supply means mounted in the housing;

kneading means for kneading the ingredients of bread with water into dough in the container, said kneading means comprising a rotary shaft which extends through the bottom of said container, at least one rotary vane mounted on an upper end of said rotary shaft inside of said container to extend perpendicularly to said rotary shaft, a fixed rod mounted in said container adjacent to and spaced from said rotary vane, said fixed rod being oriented transverse to the axis of rotation of said rotary shaft, and a motor mounted in said housing outside of said container for driving said rotary shaft to effect movement of said vane past said fixed rod thereby to cause the dough being kneaded to turn about said fixed rod as said vane rotates in said container;

a heater in the housing for baking the dough in the container; and a controller for performing, in a sequential order, a kneading step in which water is supplied from the water supply means to the container and the kneading means is driven to produce the dough, a fermentation step for fermenting the dough, and a baking step for baking the fermented dough by use of the heater.

2. An automatic bread baking machine according to claim 1, wherein the container is square-tubular in shape and its axis is substantially aligned with said rotary shaft, said rotary vane extending from said shaft to the vicinity of the inner peripheral surface of the container, the length of said vane being greater than the length of said fixed rod, a portion of the rotary vane opposing said fixed rod in parallel relation thereto, the length of said vane portion being less than half of the entire length of the rotary vane.

3. An automatic bread baking machine according to claim 1, wherein said vane rotates in a plane which is adjacent and parallel to the bottom of the container, said fixed rod being detachably fixed to a side panel of the container at a position above said plane.

4. An automatic bread baking machine according to claim 3, wherein a hole is made in one end portion of the rotary vane for receiving the upper end portion of the rotary shaft, said hole being so shaped that the rotary vane can be lifted off from the rotary shaft in its axial direction and so that the rotary vane and the rotary shaft are operatively interconnected with each other in the direction of rotation.

5. An automatic bread baking machine according to claim 4, wherein the rotary shaft is comprised of first and second rotary shafts, the first rotary shaft being inserted into a first bearing fixed to the bottom of the container at the center thereof and rotatably supported thereto and the second rotary shaft being inserted into a second bearing fixed to the housing and rotatably supported thereto, and wherein clutch means is provided for disengageably coupling the lower end of the first rotary shaft and the upper end of the second rotary shaft in the vertical direction.

6. An automatic bread baking machine according to claim 3, wherein a temperature sensor is disposed in an inner end portion of a bore formed in the fixed rod in concentric relation thereto and a lead to the temperature sensor is led out of the container through the bore, said controller including means for determining the completion of the dough kneading step on the basis of the temperature detected by the temperature sensor.

7. An automatic bread baking machine according to claim 1, wherein the rotary vane is provided with a projection which is adjacent but spaced from the fixed rod when the rotary vane is just opposite to said rod.

8. An automatic bread baking machine according to claim 1, wherein the rotary shaft is formed by a sleeve shaft and a stationary shaft is inserted through the sleeve shaft and is fixed to the housing, and wherein the stationary shaft projects into the container and the fixed rod is detachably mounted on the projecting end portion of the stationary shaft.

9. An automatic bread baking machine according to claim 8, wherein a temperature sensor is disposed in the projected end portion of the stationary shaft and a lead to the temperature sensor is led out of the container through the stationary shaft, and the baking machine includes means for determining the completion of the dough kneading step on the basis of the temperature detected by the temperature sensor.

10. An automatic bread baking machine according to claim 1, which includes means for rotating the fixed rod about the center of rotation of the rotary vane.

11. An automatic bread baking machine according to claim 1, wherein the water supply means is means for guiding water available from an external water service into the case and for supplying the water to the container.

12. An automatic bread baking machine according to claim 1, wherein the water supply means is a water tank removably mounted in the housing, for containing water.

13. An automatic bread baking machine according to claim 12, wherein a heat-insulating layer is provided around the water tank to prevent a temperature rise of the water in the tank.

14. An automatic bread baking machine according to claim 13, wherein an ice box for containing ice is disposed in the water tank to prevent a temperature rise of the water in the water tank.

15. An automatic bread baking machine according to claim 1, wherein a container mount is fixed to the bottom of the container, for detachably mounting it on a stationary part of the housing, and wherein a heat-insulating layer is interposed between the mount and the bottom of the container.

16. An automatic bread baking machine according to claim 15, wherein a heat-absorbing plate is interposed between the heat-insulating layer and the bottom of the container in close contact with the latter in a manner to project out therefrom as a flange.

17. An automatic bread baking machine according to claim 1, wherein said container is substantially hermetically sealed, and wherein a recess is formed in the top panel of the container and at least one small hole is made in said top panel at the center of the recess for supplying water from the water supply means into the container and for releasing steam from the container.

18. An automatic bread baking machine according to claim 1, wherein the top panel of said container has a water-retaining aperture therein which permits the passage therethrough of water and soaking water.

19. An automatic bread baking machine according to claim 1, 3, 12 or 15, wherein said heater comprises a ring-shaped top heater disposed slightly above the top panel of the container substantially in parallel to and coaxially therewith, and a ring-shaped bottom heater disposed slightly below the bottom panel of the container substantially in parallel to and coaxially therewith.

20. An automatic bread baking machine according to claim 1, 3, 12 or 15, which includes temperature sensing means for detecting the temperature in the housing, and in which the controller includes means for controlling the temperature in the housing in each of the fermentation and baking steps on the basis of the detected output from the temperature sensing means.

21. An automatic bread baking machine according to claim 1, 3, 12 or 15, wherein the controller includes means for performing degassing of the dough in the fermentation step by rotating the rotary vane for a short period of time.

22. An automatic bread baking machine according to claim 1, 3, 12 or 15, wherein the controller includes a clock, means for setting the time at which it is desired to complete the baking step, and means for performing the kneading step and the subsequent steps by reference to the clock in accordance with the time set by the setting means.

23. An automatic bread baking machine according to claim 1, which includes cooling means for controlling the temperature in the housing, and wherein the controller includes means for controlling the temperature in the housing during the kneading step and prior thereto by use of the cooling means.

24. An automatic bread baking machine according to claim 1, 3, 12 or 15, which includes a heating chamber provided in the housing to surround the container, for isolating the container from the other parts in the housing.

25. An automatic bread baking machine according to claim 1, 3, 12 or 15, which includes a fan for blowing an air current into the container to cool it.

26. An automatic bread baking machine according to claim 25, wherein the top panel of the container has a water-retaining aperture therein which permits the passage therethrough of water and soaking water, the air current from the fan being passed into the container through the water-retaining aperture.

* * * * *